(12) United States Patent
Koga

(10) Patent No.: US 11,073,706 B2
(45) Date of Patent: Jul. 27, 2021

(54) TRANSMITTER AND BIAS ADJUSTMENT METHOD

(71) Applicant: NEC Corporation, Tokyo (JP)

(72) Inventor: Tadashi Koga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 235 days.

(21) Appl. No.: 16/308,905

(22) PCT Filed: Apr. 3, 2017

(86) PCT No.: PCT/JP2017/013951
§ 371 (c)(1),
(2) Date: Dec. 11, 2018

(87) PCT Pub. No.: WO2018/012054
PCT Pub. Date: Jan. 18, 2018

(65) Prior Publication Data
US 2019/0158187 A1 May 23, 2019

(30) Foreign Application Priority Data
Jul. 15, 2016 (JP) .............................. JP2016-140698

(51) Int. Cl.
*H04B 10/516* (2013.01)
*H04B 10/54* (2013.01)
(Continued)

(52) U.S. Cl.
CPC ......... *G02F 1/0123* (2013.01); *H04B 10/516* (2013.01); *H04B 10/5161* (2013.01); *H04B 10/541* (2013.01); *H04B 10/564* (2013.01)

(58) Field of Classification Search
CPC combination set(s) only.
See application file for complete search history.

(56) References Cited

U.S. PATENT DOCUMENTS

2001/0007508 A1\* 7/2001 Ooi ..................... G02F 1/0123
359/245
2002/0003648 A1\* 1/2002 Kobayashi ............ G02F 1/0123
398/182
(Continued)

FOREIGN PATENT DOCUMENTS

CN 101043269 A 9/2007
EP 1 975 693 A1 10/2008
(Continued)

OTHER PUBLICATIONS

Japanese Decision to Grant a Patent issued in Japanese Patent Application No. 2018-527392, dated Oct. 8, 2019, 5 pages.
(Continued)

*Primary Examiner* — Omar S Ismail

(57) ABSTRACT

A transmitter includes an optical modulator, a drive unit, a deviation identification signal generation unit, and a bias control unit. The deviation identification signal generation unit generates a signal value in accordance with a deviation of a bias voltage of the optical modulator by amplifying a signal value of a dither signal extracted from a modulated signal output from the optical modulator by a factor set for each of a plurality of modulation schemes so as to generate a uniform signal value. The bias control unit generates a bias value at which a center of a variation range, which is a range from a maximum value to a minimum value of the drive signal, corresponds to transmission characteristics of the optical modulator according to one predetermined adjustment method by using the signal value generated by the deviation identification signal generation unit.

7 Claims, 18 Drawing Sheets

(51) Int. Cl.
*H04B 10/564* (2013.01)
*G02F 1/01* (2006.01)

(56) References Cited

U.S. PATENT DOCUMENTS

| | | | |
|---|---|---|---|
| 2004/0190910 A1* | 9/2004 | Akiyama | G02F 1/0121 |
| | | | 398/186 |
| 2008/0239448 A1 | 10/2008 | Tanaka et al. | |
| 2011/0032594 A1 | 2/2011 | Tanaka et al. | |
| 2012/0155880 A1* | 6/2012 | Nishimoto | G02F 1/0123 |
| | | | 398/79 |
| 2014/0029956 A1* | 1/2014 | Le Taillandier De Gabory | H04B 10/541 |
| | | | 398/186 |
| 2014/0286644 A1* | 9/2014 | Oshima | E05F 15/43 |
| | | | 398/118 |
| 2015/0236792 A1* | 8/2015 | Sugihara | H04B 10/516 |
| | | | 398/183 |
| 2016/0050470 A1* | 2/2016 | Swinkels | H04L 41/04 |
| | | | 398/45 |
| 2016/0156418 A1 | 6/2016 | Yamanaka et al. | |
| 2016/0173304 A1 | 6/2016 | Le Taillandier De Gabory et al. | |
| 2016/0282699 A1 | 9/2016 | Gottwald et al. | |

FOREIGN PATENT DOCUMENTS

| | | |
|---|---|---|
| EP | 2 782 270 A1 | 9/2014 |
| JP | 2008-249848 A | 10/2008 |
| JP | 2011-22479 A | 2/2011 |
| JP | 2015-95889 A | 5/2015 |
| WO | 2011/030763 A1 | 3/2011 |
| WO | WO-2013/027734 A1 | 2/2013 |
| WO | WO-2015/015533 A1 | 2/2015 |
| WO | WO-2015/159528 A1 | 10/2015 |

OTHER PUBLICATIONS

International Search Report corresponding to PCT/JP2017/013951, dated Jul. 4, 2017 (5 pages).
Cho, P.S., et al., "Bias Control for Optical OFDM Transmitters," IEEE Photonics Technology Letters, Jul. 15, 2010, vol. 22, No. 14, pp. 1030-1032.
Sotoodeh, Mohammad, et al., Modulator Bias and Optical Power Control of Optical Complex E-Field Modulators, Journal of Lightwave Technology, Aug. 1, 2011, vol. 29, No. 15, pp. 2235-2248.
Extended European Search Report issued in European Patent Application No. 17827188.8, dated Jun. 26, 2019, 8 pages.
Chinese Office Action for CN Application No. 201780043609.9 dated May 17, 2021 with English Translation.

* cited by examiner

BIAS VOLTAGE TOO HIGH

BIAS VOLTAGE APPROPRIATE

BIAS VOLTAGE TOO LOW

TRANSMITTER AND BIAS ADJUSTMENT METHOD

CROSS-REFERENCE TO RELATED APPLICATIONS

This application is a national stage application of International Application No. PCT/JP2017/013951 entitled "TRANSMITTER AND BIAS ADJUSTMENT METHOD," filed on Apr. 3, 2017, which claims priority to Japanese Patent Application No. 2016-140698, filed on Jul. 15, 2016, the disclosures of each which are hereby incorporated by reference in their entirety.

TECHNICAL FIELD

The present invention relates to a transmitter and a bias adjustment method and, particularly, to a transmitter and a bias adjustment method for adjusting a bias voltage of an optical modulator.

BACKGROUND ART

Ultra-fast long-distance optical transmission systems with 40 Gbit/s, 100 Gbit/s or higher date rate are becoming widespread, replacing optical transmission systems with 2.5 Gbit/s or 10 Gbit/s data rate. Those ultra-fast long-distance optical transmission systems are expected to adopt phase shift keying or digital coherent detection. The phase shift keying is excellent in characteristics required for long-distance optical fiber transmission, such as OSNR (Optical Signal to Noise Ratio) tolerance, CD (Chromatic Dispersion) tolerance and PMD (Polarization Mode Dispersion) tolerance. On the other hand, the digital coherent detection combines coherent detection at the receiving end and digital signal processing technology.

As the phase shift keying, BPSK (Binary Phase Shift Keying) and QPSK (Quadrature Phase Shift Keying) are under review for adoption in view of the balance between the transmission characteristics and the easiness and cost of implementation. Further, in order to achieve an increase in transmission capacity without an increase in optical bandwidth to use, QAM (Quadrature Amplitude Modulation) with high optical frequency usage efficiency is also under review. For example, the research and development of multilevel modulation schemes such as 16 QAM using quadrature drive signals and 64 QAM using octal drive signals are actively carried out.

It is assumed in the following description that BPSK is a type of QAM where a modulation level is binary, and QPSK is a type of QAM where a modulation level is quadrature. Thus, QAM with a modulation level of m is represented as mQAM in the following description.

In mQAM, the eye opening of a transmitted light waveform of an optical modulator can be increased by adjusting the center of the amplitude of a drive electrical signal waveform along each of In-phase (I) axis and Quadrature-phase (Q) axis to coincide with the lower limit (i.e., null point) of the slope of transmission characteristics of the optical modulator. In other words, it is possible to increase the eye opening by adjusting the relationship between drive voltage—optical transmission characteristics of an optical modulator and a drive electrical signal waveform to an optimum point. Further, it is possible to minimize the power penalty in a receiver by converting a drive electrical signal into an optical amplitude/phase modulation signal as linearly as possible.

It is, however, difficult to maintain the optimum point at all times. This is because the drive voltage—optical transmission characteristics of an optical modulator vary depending on individual differences, temperature changes, variations with time and the like of the optical modulator.

In view of the above, a technique to maintain the optimum point by adjusting a bias voltage to be supplied to an optical modulator has been proposed. For example, Patent Literature 1 discloses controlling a bias voltage of an optical modulator by using a low-frequency signal.

CITATION LIST

Patent Literature

PTL1: Japanese Unexamined Patent Application Publication No. 2008-249848

SUMMARY OF INVENTION

Technical Problem

When a transmitter supports a plurality of modulation schemes, it is required to appropriately adjust a bias voltage of a modulator for each of the modulation schemes. Although Patent Literature 1 discloses an optical modulation device capable of switching a modulation scheme, it discloses nothing about switching of a modulation scheme where a drive electrical signal can have more than two voltage values, such as 16 QAM or 64 QAM, for example. Thus, the technique disclosed in Patent Literature 1 cannot appropriately adjust a bias voltage of a modulator when a plurality of modulation schemes to be switched include a modulation scheme where the number of voltage values which a drive electrical signal can take exceeds 2.

The present invention has been accomplished to solve the above problems and an object of the present invention is thus to provide a transmitter and a bias adjustment method capable of appropriately adjusting a bias voltage of a modulator regardless of a modulation scheme.

Solution to Problem

A transmitter according to one aspect of the present invention includes an optical modulator configured to modulate continuous wave light by any one of a plurality of modulation schemes according to a drive signal, a drive means for generating the drive signal based on information data, a deviation identification signal generation means for generating a signal value in accordance with a deviation of a bias voltage of the optical modulator by amplifying a signal value of a dither signal extracted from a modulated signal output from the optical modulator by a factor set for each of the plurality of modulation schemes so as to generate a uniform signal value, and a bias control means for generating a bias value at which a center of a variation range from a maximum value to a minimum value of the drive signal corresponds to transmission characteristics of the optical modulator according to one predetermined adjustment method by using the signal value generated by the deviation identification signal generation means, wherein the optical modulator operates with a bias voltage adjusted based on the bias value.

A bias adjustment method according to one aspect of the present invention includes generating a drive signal based on information data, modulating continuous wave light by any one of a plurality of modulation schemes according to the drive signal and generating a modulated signal in an optical modulator, extracting a dither signal from the modulated signal, generating a signal value in accordance with a deviation of a bias voltage of the optical modulator by amplifying a signal value of the extracted dither signal by a factor set for each of the plurality of modulation schemes so as to generate a uniform signal value, and generating a bias value at which a center of a variation range from a maximum value to a minimum value of the drive signal corresponds to transmission characteristics of the optical modulator according to one predetermined adjustment method by using the generated signal value, wherein the optical modulator operates with a bias voltage adjusted based on the bias value.

Advantageous Effects of Invention

According to the present invention, it is possible to provide a transmitter and a bias adjustment method capable of appropriately adjusting a bias voltage of a modulator regardless of a modulation scheme.

DESCRIPTION OF EMBODIMENTS

Overview of Embodiment

Figure 1:
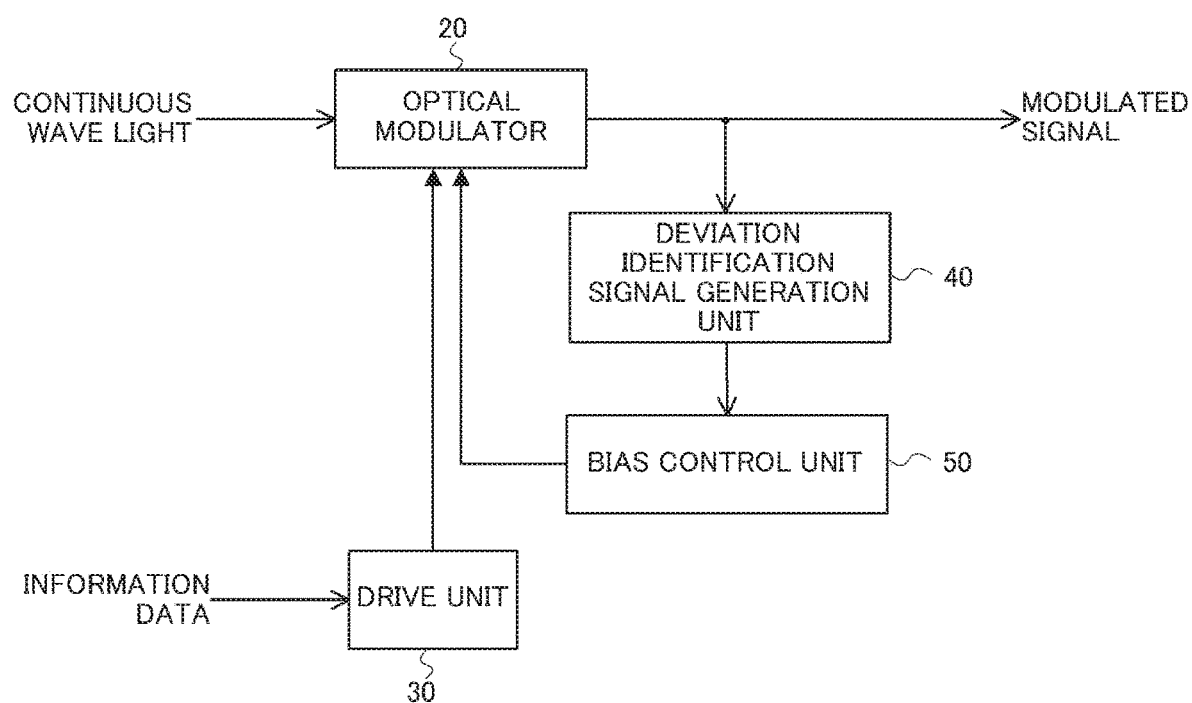
FIG. 1 is a block diagram showing the configuration of a transmitter according to the overview of an embodiment.

Prior to describing an embodiment, the overview of an embodiment according to the present invention is described. FIG. 1 is a block diagram showing the configuration of a transmitter 10 according to the overview of an embodiment. In FIG. 1, the arrow indicating the direction of a signal or data flow in one way represents the direction of a signal or data flow in a simple manner, but the flow may be in two ways. As shown in FIG. 1, the transmitter 10 includes an optical modulator 20, a drive unit (drive means) 30, a deviation identification signal generation unit (deviation identification signal generation means) 40, and a bias control unit (bias control means) 50.

The optical modulator 20 modulates continuous wave light from a light source, which is not shown, in accordance with a drive signal (which is also referred to as a drive electrical signal) output from the drive unit 30. The optical modulator 20 modulates continuous wave light by any one of a plurality of modulation schemes. For example, the optical modulator 20 modulates continuous wave light by a modulation scheme selected from a plurality of predetermined modulation schemes. The plurality of modulation schemes may be arbitrary modulation schemes. For example, the plurality of modulation schemes may include BPSK, QPSK or QAM. Further, the plurality of modulation schemes may include intensity modulation, not limited to phase modulation. A modulation scheme included in the plurality of modulation schemes may be a modulation scheme where a drive signal can have two voltage values, such as intensity modulation, BPSK or QPSK, or a modulation scheme where a drive signal can have more than two voltage values, such as 16 QAM.

The modulated signal that is output as a result of modulation in the optical modulator 20 includes a dither signal. The dither signal is a signal added to control a bias voltage on the optical modulator 20, and it is a low-frequency signal having a predetermined frequency. The dither signal is a low-frequency signal at a frequency in the order of kHz, for example.

The drive unit 30 generates a drive signal to be output to the optical modulator 20 based on input information data.

The deviation identification signal generation unit 40 amplifies the signal value of a dither signal extracted from the modulated signal output from the optical modulator 20 by a factor that is set for each of the plurality of modulation schemes so as to generate a uniform signal value, and thereby generates a signal value in accordance with the deviation of a bias voltage of the optical modulator 20. The deviation is not limited to the amount of deviation of the bias voltage from the optimum point, and it also includes the direction of deviation (i.e., whether the deviation from the optimum point is in the positive direction or the negative direction of a voltage).

The bias control unit 50 generates a bias value at which the center of the amplitude of a drive signal corresponds to the transmission characteristics of the optical modulator 20 according to one predetermined adjustment method by using the signal value generated by the deviation identification signal generation unit 40. The center of the amplitude of a drive signal is the center of the variation range, which is the range from the maximum value to the minimum value of the drive signal. In other words, the center of the amplitude of a drive signal is the center of the peak-to-peak range of the drive signal. Thus, the bias control unit 50 generates a bias value at which a bias voltage coincides with the minimum point of the transmission characteristics of the optical modulator 20. The bias value is a parameter that specifies the voltage value of a bias voltage. The bias control unit 50 outputs the generated bias value to the optical modulator 20. The optical modulator 20 operates with the bias voltage adjusted based on the bias voltage.

When a modulation scheme is different, the signal value of the extracted dither signal is not always the same even when the deviation of a bias voltage from the optimum value is the same. For example, when the deviation of a bias voltage is X, the signal value of the extracted dither signal when a first modulation scheme is employed is $d_A$, and the signal value of the extracted dither signal when a second modulation scheme is employed is $d_B$. In other words, while the fact that the signal value of the extracted dither signal when the first modulation scheme is employed is $d_A$ means that the deviation of a bias voltage is X, the deviation of a bias voltage is not X even when the signal value of the extracted dither signal when the second modulation scheme is employed is $d_A$. Therefore, it is generally necessary to use an adjustment method in accordance with a modulation scheme when controlling the bias voltage by using the signal value of the extracted dither signal.

However, because the deviation identification signal generation unit 40 generates a signal value in accordance with the deviation of the bias voltage as described above, the bias control unit 50 can generate an appropriate bias value according to one predetermined adjustment method. For example, when the deviation of the bias voltage is X, if a signal value dx which is uniform regardless of a modulation scheme can be obtained, it is possible to uniquely identify the deviation of the bias voltage from this signal value dx regardless of a modulation scheme. In view of this, the deviation identification signal generation unit 40 generates a uniform signal value dx by multiplying the signal value $d_A$ of the dither signal when the first modulation scheme is employed by $dx/d_A$ times, for example. Further, the deviation identification signal generation unit 40 generates a uniform signal value dx by multiplying the signal value $d_B$ of the dither signal when the second modulation scheme is employed by $dx/d_B$ times, for example. Note that each of $dx/d_A$ and $dx/d_A$ is a factor that is preset for each modulation scheme. Note that this factor may be a positive value or a negative value. The factor can be determined by carrying out simulation, experiment or the like for each modulation scheme. In this manner, the bias control unit 50 obtains a signal value in accordance with the deviation of the bias voltage regardless of a modulation scheme and it is thereby possible to control the bias voltage by an arbitrary adjustment method regardless of a modulation scheme.

As described above, in the transmitter 10, it is possible to adjust the bias voltage for the optical modulator 20 by an arbitrary adjustment method regardless of a modulation scheme based on a signal value in accordance with the deviation of the bias voltage without depending on a modulation scheme. Therefore, the transmitter 10 is capable of appropriately adjusting a bias voltage of a modulator regardless of a modulation scheme.

Embodiment

Figure 2:
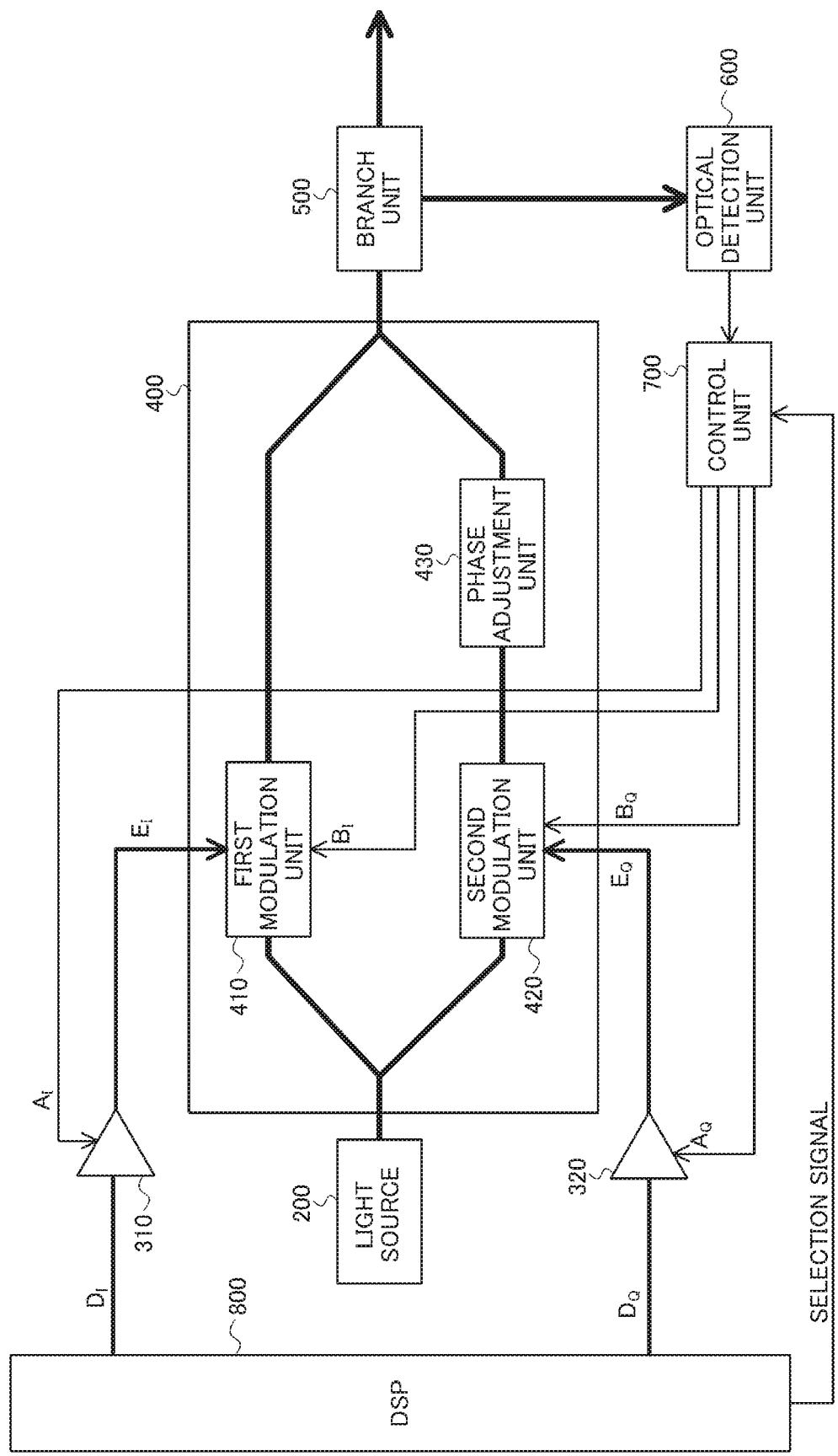
FIG. 2 is a block diagram showing the configuration of an optical transmitter according to an embodiment.

An embodiment of the present invention is described hereinafter in detail with reference to the drawings. FIG. 2 is a block diagram showing the configuration of a transmitter 100 according to an embodiment. In FIG. 2, the arrow indicating the direction of a signal or data flow in one way represents the direction of a signal or data flow in a simple manner, but the flow may be in two ways. As shown in FIG. 2, the transmitter 100 includes a light source 200, a first driver unit 310, a second driver unit 320, an optical modulator 400, a branch unit 500, an optical detection unit 600, a control unit 700, and a DSP (Digital Signal Processor) 800.

The light source 200 is a laser diode, for example, and outputs continuous wave (CW) light. Note that the continuous wave light is also called continuous wave oscillation light. The CW light output from the light source 200 is split into two parts in the optical modulator 400, and one part is input to a first modulation unit 410, and the other part is input to a second modulation unit 420, which are described later.

The first driver unit 310 and the second driver unit 320 are driver circuits, and generate drive signals to be output to the optical modulator 400 based on input information data. The first driver unit 310 and the second driver unit 320 are the equivalent of the drive unit 30 described above.

A data signal $D_I$ (i.e., information data) encoded in accordance with an applied modulation scheme is input from the DSP 800 to the first driver unit 310. Further, a drive amplitude $A_I$ (which is also referred to as amplitude information) is input from the control unit 700 to the first driver unit 310. The first driver unit 310 adjusts the amplitude of the input data signal $D_I$ based on the input drive amplitude $A_I$, and outputs a drive electrical signal $E_I$ to the first modulation unit 410 of the optical modulator 400.

A data signal $D_Q$ (i.e., information data) encoded in accordance with an applied modulation scheme is input from the DSP 800 to the second driver unit 320. Further, a drive amplitude $A_Q$ (which is also referred to as amplitude information) is input from the control unit 700 to the second driver unit 320. The second driver unit 320 adjusts the amplitude of the input data signal $D_Q$ based on the input drive amplitude $A_Q$, and outputs a drive electrical signal $E_Q$ to the second modulation unit 420 of the optical modulator 400.

A bias voltage of the optical modulator 400 is adjusted by a bias value input from the control unit 700. Then, the optical modulator 400 optically modulates the CW light input from the light source 200 by using the drive electrical signal input from the driver units 310 or 320, and outputs a modulated signal. As shown in FIG. 2, the optical modulator 400 according to this embodiment includes the first modulation unit 410, the second modulation unit 420, and a phase adjustment unit 430.

The first modulation unit 410 and the second modulation unit 420 are Mach-Zehnder modulators, for example.

A bias voltage of the first modulation unit 410 is adjusted by a bias value $B_I$ input from the control unit 700. Then, the first modulation unit 410 modulates one CW light input from the light source 200 by using the drive electrical signal $E_I$ input from the first driver unit 310, and outputs a modulated signal.

A bias voltage of the second modulation unit 420 is adjusted by a bias value $B_Q$ input from the control unit 700. Then, the second modulation unit 420 modulates the other CW light input from the light source 200 by using the drive electrical signal $E_Q$ input from the second driver unit 320, and outputs a modulated signal.

The phase adjustment unit 430 is a phase shifter, and shifts the phase of the modulated signal output from the second modulation unit 420 by $\pi/2$ and outputs the signal.

The modulated signal output from the first modulation unit 410 and the modulated signal with the phase shifted by $\pi/2$ output from the phase adjustment unit 430 are combined on a path, and output as a modulated signal from the optical modulator 400.

The branch unit 500 is an optical coupler, for example, and it divides the modulated signal output from the optical modulator 400 into two parts, transmits one part to an optical transmission path, and outputs the other part to the optical detection unit 600.

Figure 3:
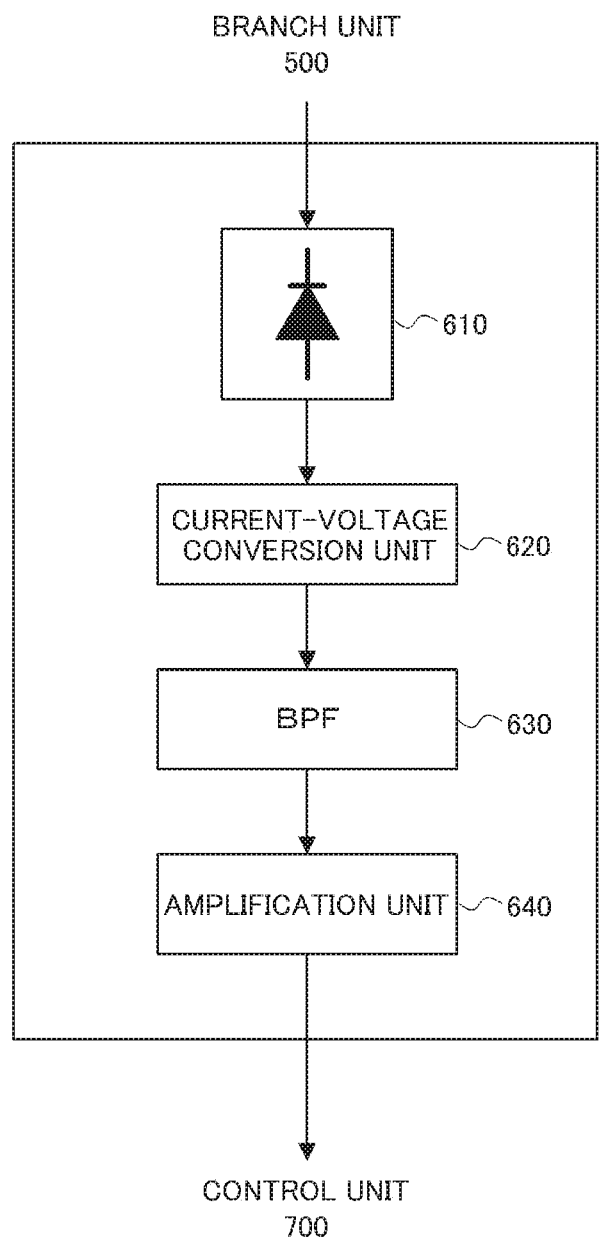
FIG. 3 is a block diagram showing an example of the configuration of an optical detection unit according to an embodiment.

The optical detection unit 600 converts the modulated signal divided in the branch unit 500 into an electrical signal, extracts and amplifies a specified frequency component, and then outputs the signal to the control unit 700. FIG. 3 is a block diagram showing an example of the configuration of the optical detection unit 600. In FIG. 3, the arrow indicating the direction of a signal or data flow in one way represents the direction of a signal or data flow in a simple manner, but the flow may be in two ways. As shown in FIG. 3, the optical detection unit 600 includes a photoelectric conversion unit 610, a current-voltage conversion unit 620, a BPF (Band Pass Filter) 630, and an amplification unit 640.

The photoelectric conversion unit 610 is a photoelectric conversion element, and it photoelectrically converts the modulated signal divided in the branch unit 500 into an electrical signal, and outputs a current value in accordance with the optical power of the modulated signal. The current-voltage conversion unit 620 is a current-voltage conversion circuit, and it converts the current value in accordance with the optical power of the modulated signal output from the photoelectric conversion unit 610 into a voltage value. The BPF 630 is a narrow band-pass filter that extracts a frequency component including a frequency $f_0$ from the output value of the current-voltage conversion unit 620. The frequency $f_0$ is the frequency of the dither signal. The amplification unit 640 is an amplifier, for example, and amplifies the frequency component extracted in the BPF 630 and outputs it to the control unit 700.

The control unit 700 generates a bias value to be output to the optical modulator 400 and a drive amplitude to be output to the driver units 310 and 320. Further, the control unit 700 extracts a dither signal from the frequency component input from the optical detection unit 600, and generates a bias value based on the extracted result. Note that the control unit 700 superimposes the dither signal, which is a low-frequency signal, on the drive amplitude or the bias value. The control unit 700 is described in detail later.

The DSP 800 determines a modulation scheme to be applied for transmission among a plurality of predetermined modulation schemes. The DSP 800 determines a modulation scheme to be used for transmitting information among a plurality of predetermined modulation schemes. The DSP 800 may switch between two or more modulation schemes among a plurality of predetermined modulation schemes in a time division manner. Further, the DSP 800 may encode information in accordance with a modulation scheme to be applied to transmission, and generate data signals $D_I$ and $D_Q$. The DSP 800 outputs the generated data signal $D_I$ to the first driver unit 310, and outputs the generated data signal $D_Q$ to the second driver unit 320.

Figure 4:
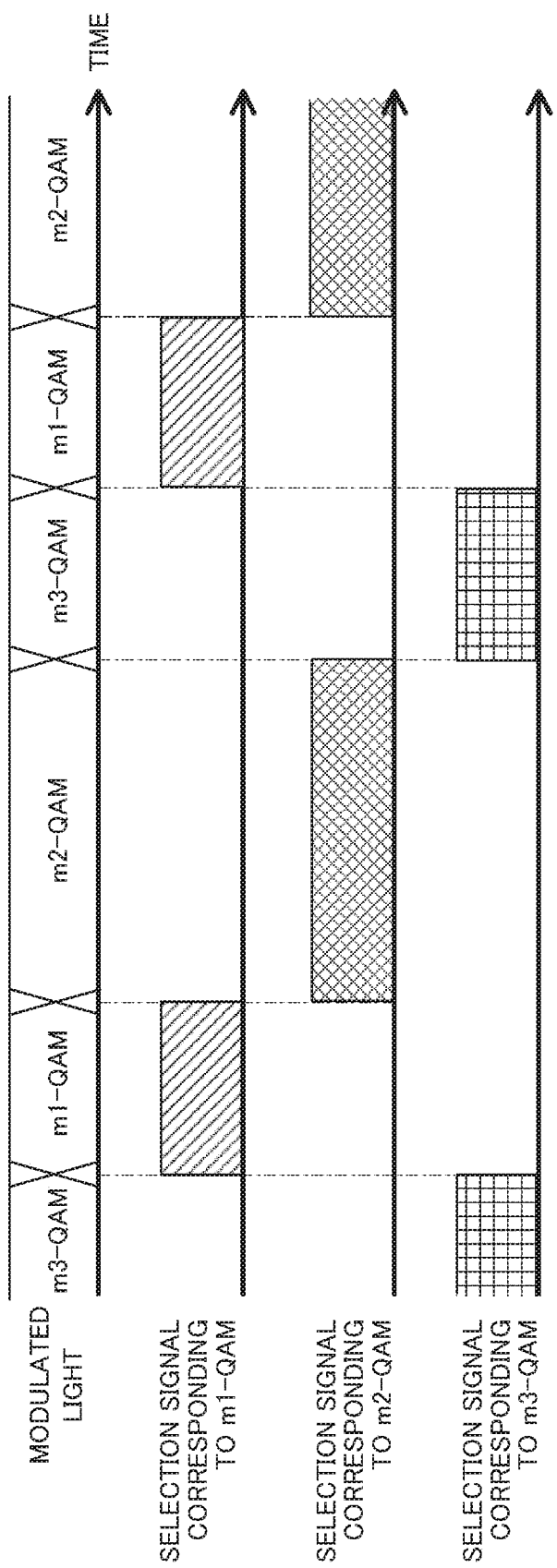
FIG. 4 is a schematic view showing an example of switching modulation schemes in a time division manner and outputting a selection signal in accordance with each scheme.

Further, the DSP 800 transmits a selection signal in accordance with the currently applied modulation scheme to the control unit 700. FIG. 4 is a schematic view showing an example of switching modulation schemes in a time division manner and outputting a selection signal in accordance with each scheme. In the example shown in FIG. 4, the DSP 800 switches among QAM (m1-QAM) where a modulation level is m1, QAM (m2-QAM) where a modulation level is m2, and QAM (m3-QAM) where a modulation level is m3 in a time division manner. Thus, a plurality of predetermined modulation schemes may include QAM with a first modulation level and QAM with a second modulation level different from the first modulation level, and the DSP 800 may switch between the QAM with the first modulation level and the QAM with the second modulation level in a time division manner. By switching a plurality of modulation schemes with different modulation levels in a time division manner, it is possible to achieve modulation with an arbitrary modulation level. Further, the DSP 800 transmits a switch signal, which is described later.

The DSP 800 includes a CPU (Central Processing Unit) and a memory, which are not shown, and performs the above-described processing by the CPU executing a program loaded to the memory, for example. Note that the DSP 800 is referred to also as a signal processing means in some cases.

Figure 5:
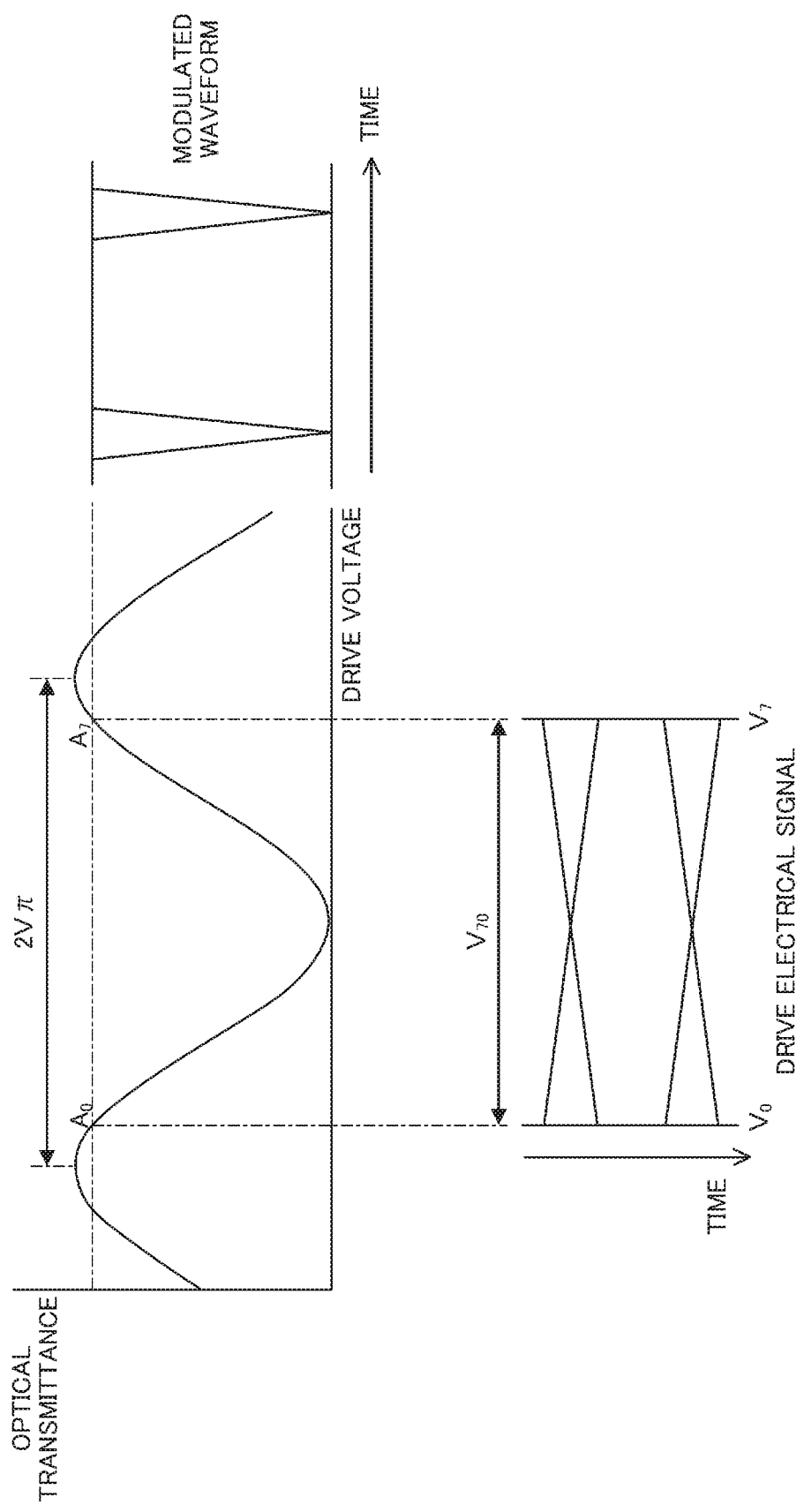
FIG. 5 is a schematic view showing the relationship between the amplitude of a drive electrical signal for driving a first modulation unit or a second modulation unit and the light transmission output of the first modulation unit or the second modulation unit when a modulation scheme in a transmitter is 4 QAM.
Figure 6:
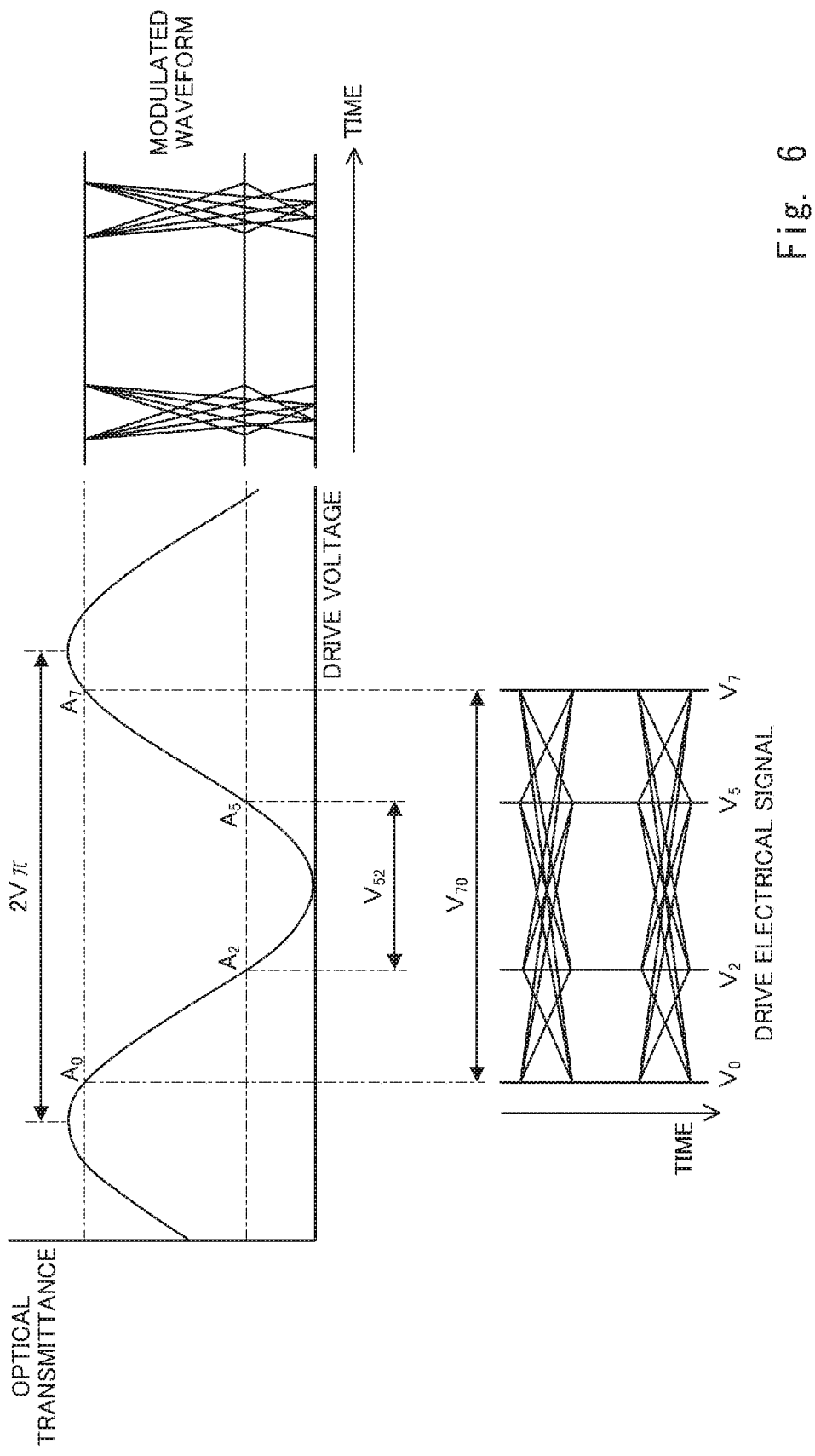
FIG. 6 is a schematic view showing the relationship between the amplitude of a drive electrical signal for driving the first modulation unit or the second modulation unit and the light transmission output the first modulation unit or the second modulation unit when a modulation scheme in a transmitter is 16 QAM.
Figure 7:
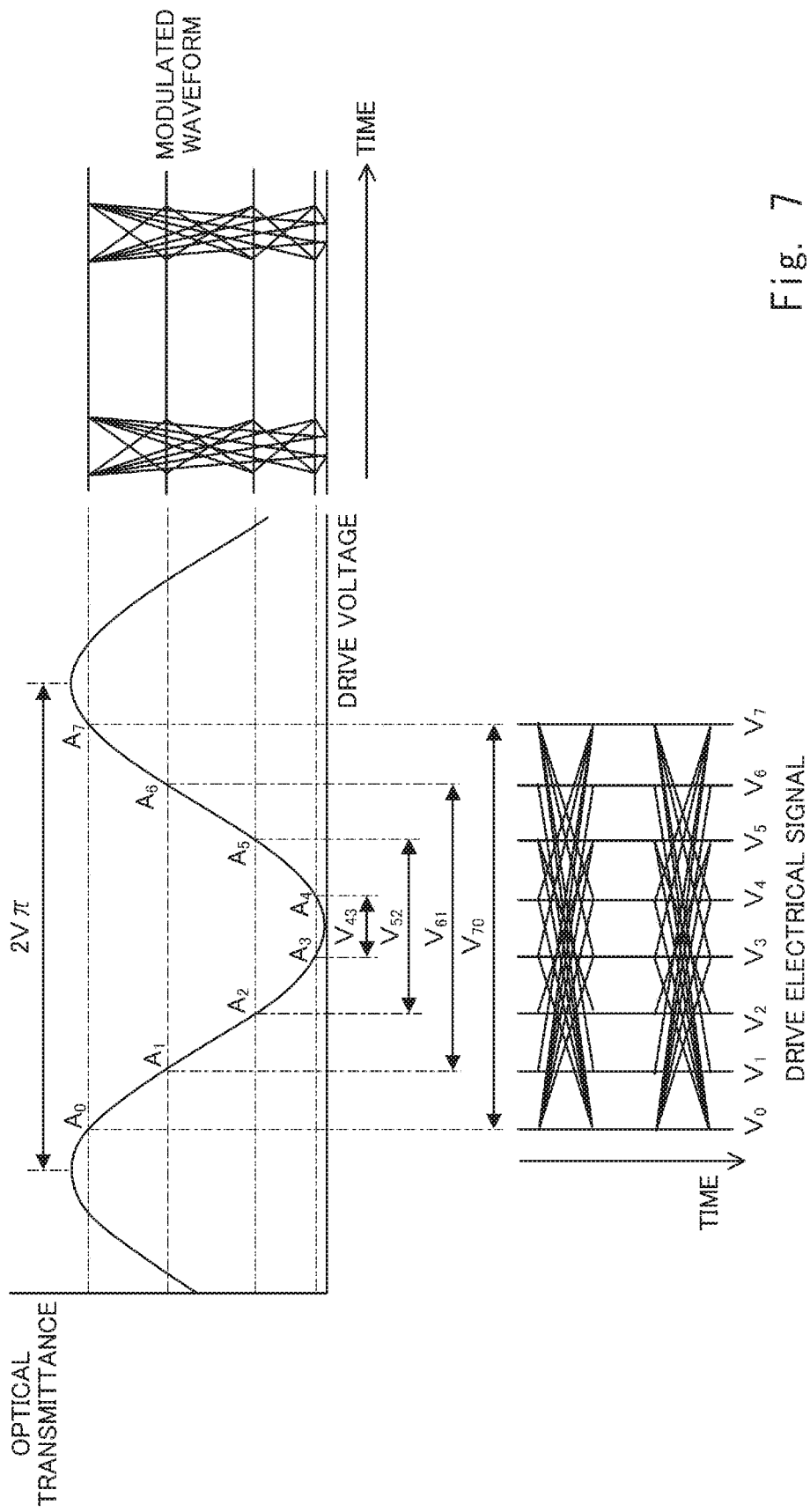
FIG. 7 is a schematic view showing the relationship between the amplitude of a drive electrical signal for driving the first modulation unit or the second modulation unit and the light transmission output the first modulation unit or the second modulation unit when a modulation scheme in a transmitter is 64 QAM.

As described above, when a modulation scheme is different, the signal value of the dither signal obtained from the modulated signal is not necessarily the same even when the deviation of the bias voltage from the optimum point is the same. Specific examples of this are described hereinafter. FIGS. 5 to 7 are schematic views showing the relationship between the amplitude of the drive electrical signal for driving the first modulation unit 410 or the second modulation unit 420 and the light transmission output of the first modulation unit 410 or the second modulation unit 420. FIG. 5 shows the relationship when a modulation scheme in the transmitter 100 is 4 QAM, FIG. 6 shows the relationship when a modulation scheme in the transmitter 100 is 16 QAM, and FIG. 7 shows the relationship when a modulation scheme in the transmitter 100 is 64 QAM. Further, in FIGS. 5 to 7 and FIG. 12, which is described later, the upper left graph is a graph showing the relationship between the drive voltage for the first modulation unit 410 or the second modulation unit 420 and the light transmission output of the first modulation unit 410 or the second modulation unit 420 (i.e., the transmission characteristics of the first modulation unit 410 or the second modulation unit 420), the lower graph is a graph showing the transition of the drive electrical signal, and the upper right graph is a graph showing the waveform of a modulated signal with the transition of the drive electrical signal.

Note that, in the graph showing the transition of the drive electrical signal (lower graph) and the graph showing the waveform of the modulated signal with the transition of the drive electrical signal (upper right graph) in FIG. 7, the illustration of transition is partly omitted in order to improve the visibility of the drawing. For example, in the lower graph of FIG. 7, the illustration of transition from the voltage value $V_0$ to $V_1$ is omitted.

Further, in the following description, a differential voltage between a voltage corresponding to the lower limit (i.e., null point) of the slope of transmission characteristics and a voltage corresponding to the peak point of the same is $V\pi$. Thus, a voltage difference corresponding to the adjacent peak points of transmission characteristics is represented as $2 V\pi$.

Figure 8:
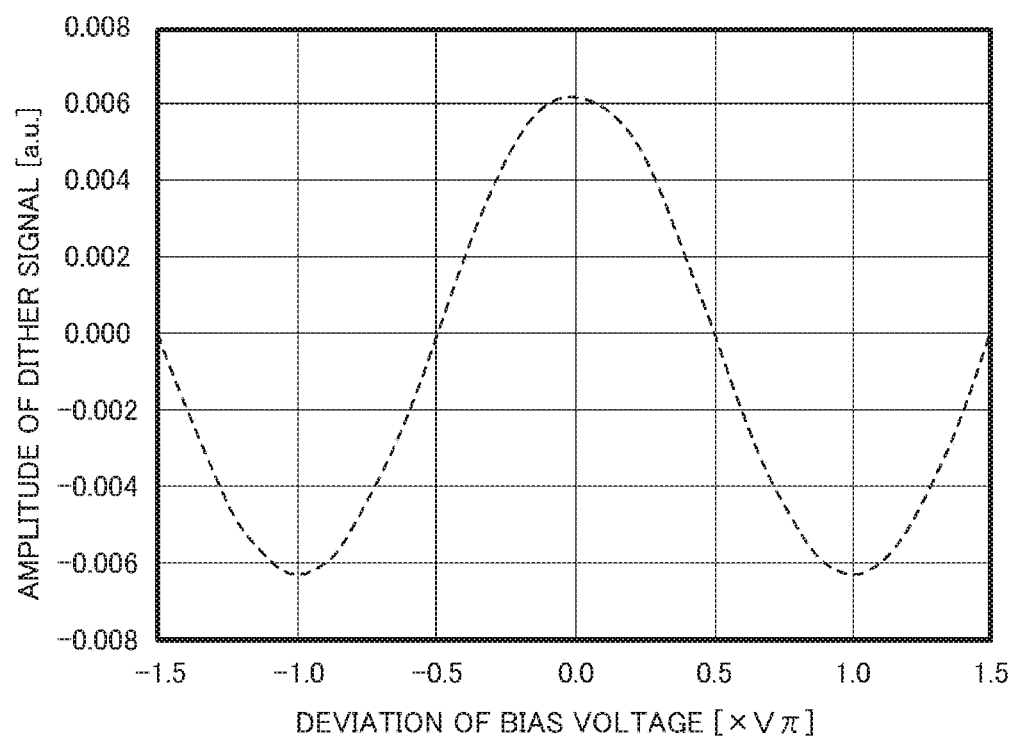
FIG. 8 is a graph showing simulation results for the voltage of a dither signal demodulated from a modulated signal, where the dither signal is superimposed on a drive amplitude, when a modulation scheme is 4 QAM.
Figure 9:
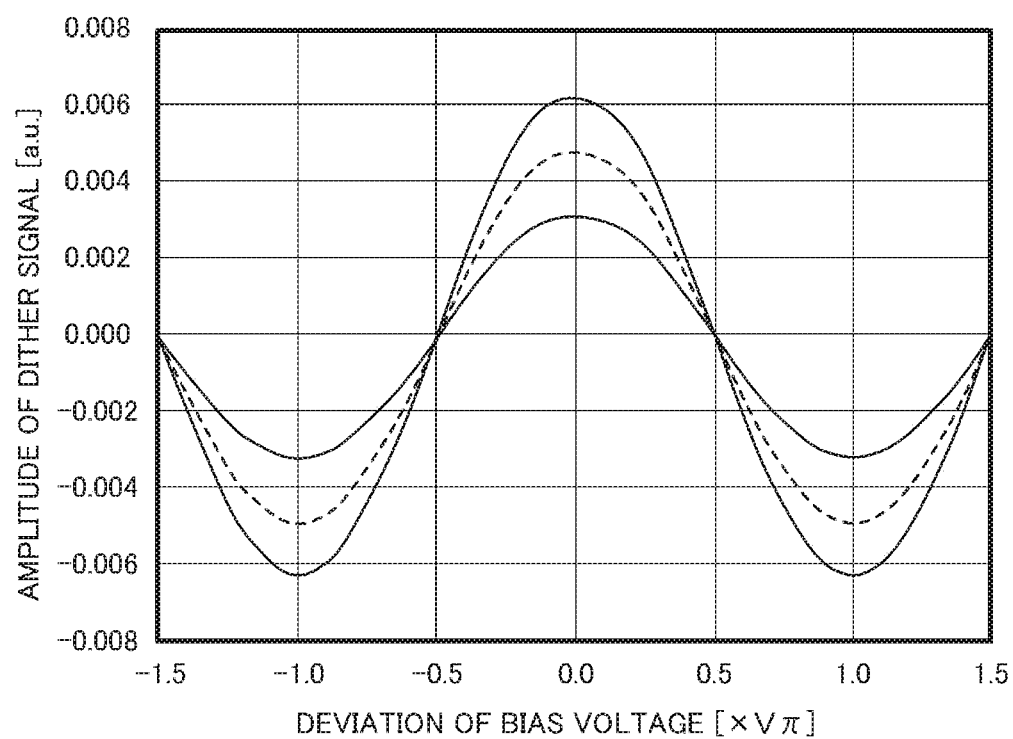
FIG. 9 is a graph showing simulation results for the voltage of a dither signal demodulated from a modulated signal, where the dither signal is superimposed on the drive amplitude, when a modulation scheme is 16 QAM.
Figure 10:
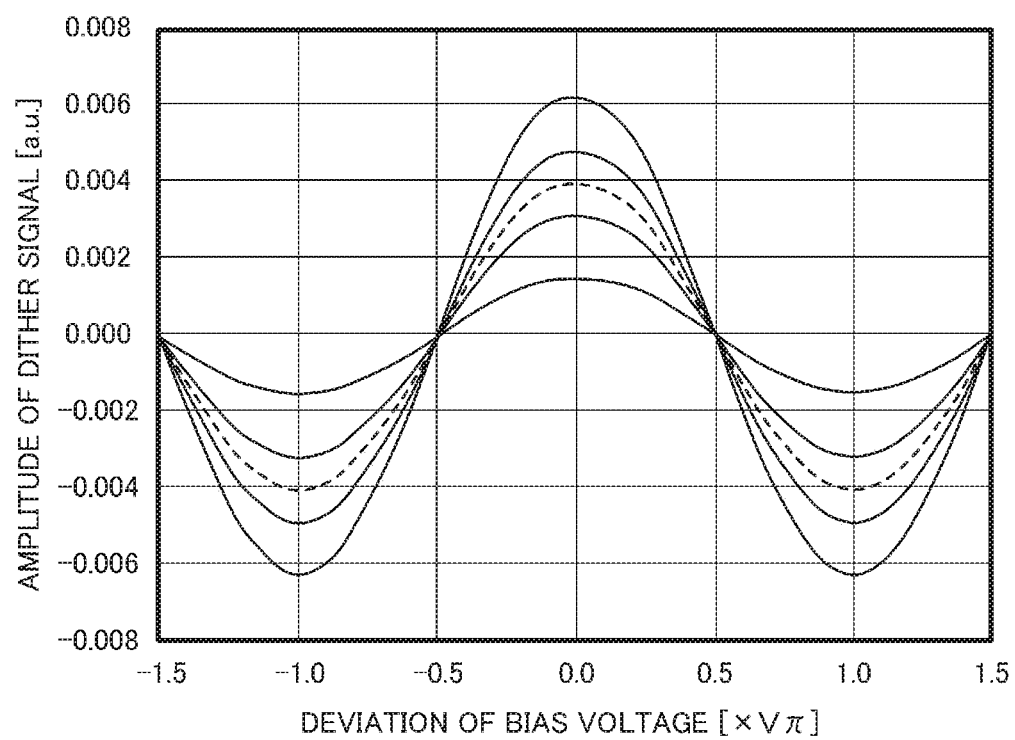
FIG. 10 is a graph showing simulation results for the voltage of a dither signal demodulated from a modulated signal, where the dither signal is superimposed on the drive amplitude, when a modulation scheme is 64 QAM.

FIGS. 8 to 10 are graphs showing simulation results for the voltage of the dither signal demodulated from the modulated signal in the case where the dither signal is superimposed on the drive amplitude. In the graphs of FIGS. 8 to 10 and FIGS. 14 to 16, which are described later, the horizontal axis indicates the deviation of the bias voltage from the optimum point, and the vertical axis indicates the amplitude of the dither signal demodulated from the modulated signal. To be more specific, FIGS. 8 to 10 are as follows.

FIG. 8 is a view corresponding to FIG. 5 and shows a graph when a modulation scheme in the transmitter 100 is 4 QAM. When a modulation scheme is 4 QAM, two points of the drive voltage, i.e., $A_0$ and $A_7$, are necessary as shown in FIG. 5. Note that the voltage of the drive electrical signal corresponding to $A_0$ is $V_0$, and the voltage of the drive electrical signal corresponding to $A_7$ is $V_7$. FIG. 8 shows a graph of simulation results regarding an amplitude $V_{70}$ (=$V_7$-$V_0$) in FIG. 5. In FIG. 8, the dashed line indicates the amplitude of the dither signal regarding the amplitude $V_{70}$. In FIG. 8, the dashed line graph shows the relationship between the amplitude of the dither signal detected through the optical detection unit 600 and the deviation of the bias voltage from the optimum point. In FIG. 8, $V_{70}$=$V\pi$ as an example.

FIG. 9 is a view corresponding to FIG. 6 and shows a graph when a modulation scheme in the transmitter 100 is 16 QAM. When a modulation scheme is 16 QAM, four points of the drive voltage, i.e., $A_0$, $A_2$, $A_5$ and $A_7$, are necessary as shown in FIG. 6. Note that the voltage of the drive electrical signal corresponding to $A_2$ is $V_2$, and the voltage of the drive electrical signal corresponding to $A_5$ is $V_5$. FIG. 9 shows a graph of simulation results regarding an amplitude $V_{70}$ (=$V_7$-$V_0$) and an amplitude $V_{52}$ (=$V_5$-$V_2$) in FIG. 6. As for the amplitude, although an amplitude by $A_0$ and $A_5$, for example, can be also generated, simulation results regarding the amplitude $V_{70}$ and the amplitude $V_{52}$ are shown as an example as described above. Further, in FIG. 9, the solid line indicates the amplitude of the dither signal regarding the amplitude $V_{70}$ and the amplitude of the dither signal regarding the amplitude $V_{52}$. Further, in FIG. 9, the dashed line is a graph indicating the average of the amplitudes indicated by the solid lines. In FIG. 9, the dashed line graph shows the relationship between the amplitude of the dither signal detected through the optical detection unit 600 and the deviation of the bias voltage from the optimum point. In FIG. 9, $V_{70}$=$V\pi$ and $V_{52}$=0.35×$V\pi$ as an example.

FIG. 10 is a view corresponding to FIG. 7 and shows a graph when a modulation scheme in the transmitter 100 is 64 QAM. When a modulation scheme is 64 QAM, eight points of the drive voltage, i.e., $A_0$ to $A_7$, are necessary as shown in FIG. 7. Note that the voltage of the drive electrical signal corresponding to $A_1$ is $V_1$, the voltage of the drive electrical signal corresponding to $A_3$ is $V_3$, the voltage of the drive electrical signal corresponding to $A_4$ is $V_4$, and the voltage of the drive electrical signal corresponding to $A_6$ is $V_6$. FIG. 10 shows a graph of simulation results regarding an amplitude $V_{70}$ (=$V_7$-$V_0$), an amplitude $V_{61}$ (=$V_6$-$V_1$), an amplitude $V_{52}$ (=$V_5$-$V_2$), and an amplitude $V_{43}$ (=$V_4$-$V_3$) in FIG. 7. As for the amplitude, although an amplitude by $A_0$ and $A_5$, for example, can be also generated, simulation results regarding the four types of amplitudes are shown as an example as described above. Further, in FIG. 10, the solid lines indicate the amplitude of the dither signal regarding the amplitude $V_{70}$, the amplitude of the dither signal regarding the amplitude $V_{61}$, the amplitude of the dither signal regarding the amplitude $V_{52}$, and the amplitude of the dither signal regarding the amplitude $V_{43}$. Further, in FIG. 10, the dashed line is a graph indicating the average of the amplitudes indicated by the solid lines. In FIG. 10, the dashed line graph shows the relationship between the amplitude of the dither signal detected through the optical detection unit 600 and the deviation of the bias voltage from the optimum point. In FIG. 10, $V_{70}$=$V\pi$, $V_{61}$=0.60×$V\pi$, $V_{52}$=0.35×$V\pi$, and $V_{43}$=0.15×$V\pi$ as an example.

As shown in FIGS. 8 to 10, even when the deviation of the bias voltage from the optimum point is the same, the amplitude value of the detected dither signal is different depending on a modulation scheme. Therefore, when adjusting the bias voltage by using the amplitude value of the detected dither signal, it is necessary to make different adjustments for each of modulation schemes.

Figure 11:
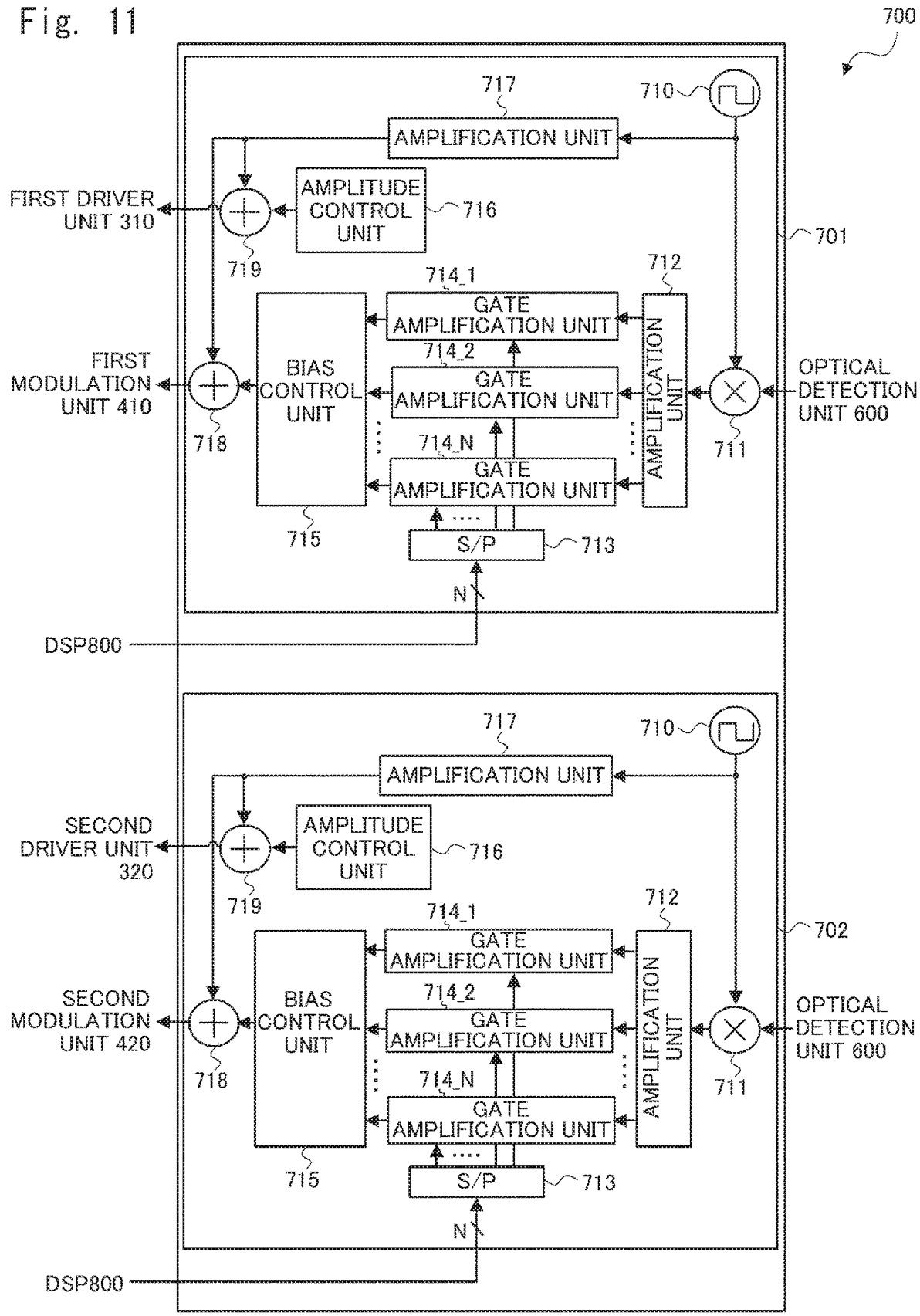
FIG. 11 is a block diagram showing an example of the configuration of a control unit according to this embodiment.

In view of the above, the control unit 700 has the following configuration in this embodiment. FIG. 11 is a block diagram showing an example of the configuration of the control unit 700 according to this embodiment. In FIG. 11, the arrow indicating the direction of a signal or data flow in one way represents the direction of a signal or data flow in a simple manner, but the flow may be in two ways. As shown in FIG. 11, the control unit 700 includes a first control unit 701 and a second control unit 702. The first control unit 701 is a control unit that outputs signals to the first modulation unit 410 and the first driver unit 310, and the second control unit 702 is a control unit that outputs signals to the second modulation unit 420 and the second driver unit 320. As shown in FIG. 11, the first control unit 701 and the second control unit 702 have the same configuration, and each control unit includes a low-frequency signal generation unit 710, a multiplier 711, amplification units 712 and 717, a serial-to-parallel converter 713, gate amplification units 714_1 to 714_N, a bias control unit 715, an amplitude control unit 716, and adders 718 and 719.

The low-frequency signal generation unit 710 is an oscillator, for example, and it generates a square wave signal with a frequency $f_0$ as the dither signal, and outputs the signal to the multiplier 711 and the amplification unit 717. Note that the signal generated by the low-frequency signal generation unit 710 is not limited to a square wave signal, and it may be a sine wave signal with the frequency $f_0$.

The multiplier 711 multiplies the frequency component input from the optical detection unit 600 by the signal with the frequency $f_0$ input from the low-frequency signal generation unit 710, and outputs it to the amplification unit 712. As a result of the multiplication by the multiplier 711, the dither signal is extracted from the frequency component input from the optical detection unit 600.

The amplification unit 712 is an amplifier, for example, and it amplifies the signal output from the multiplier 711, and outputs it to each of N (N is an integer of 1 or more) number of gate amplification units 714_1 to 714_N. N corresponds to the number of types of modulation schemes applicable to the transmitter 100.

The selection signal output from the DSP 800 is input to the serial-to-parallel converter 713. The serial-to-parallel converter 713 converts the selection signal as serial data output from the DSP 800 into parallel data, and outputs it to the gate amplification units 714_1 to 714_N. Note that, although the configuration where the selection signal is transmitted in series from the DSP 800 is shown in this embodiment, this configuration is merely an example. The selection signal may be transmitted in parallel from the DSP 800. Therefore, the serial-to-parallel converter 713 is not necessarily required depending on the way of transmission.

The selection signal output from the DSP 800 is a signal that identifies the currently applied modulation scheme, and it is a signal for instructing the gate amplification units 714_1 to 714_N corresponding to the currently applied modulation scheme to amplify and output the signal.

The gate amplification units 714_1 to 714_N are the equivalent of the above-described deviation identification signal generation unit 40 and generate a uniform signal value in accordance with the deviation of the bias voltage. The gate amplification units 714_1 to 714_N are selected according to the selection signal. One of the gate amplification units 714_1 to 714_N selected by the selection signal amplifies the signal output from the amplification unit 712 (i.e., the signal value of the extracted dither signal) by a predetermined factor, and outputs the amplified signal to the bias control unit 715. In other words, the gate amplification units 714_1 to 714_N amplify and output the signal value of the extracted dither signal. For example, each of the gate amplification units 714_1 to 714_N is composed of a switch and an amplifier. The gate amplification units 714_1 to 714_N correspond one-to-one to the modulation schemes applicable to the transmitter 100.

The following factor is set to each of the gate amplification units 714_1 to 714_N. The gate amplification units 714_1 to 714_N are designed to obtain a signal value dx which is uniform for the deviation X of the bias voltage from the optimum point. Therefore, a factor $m_1$ that is set to the gate amplification unit 714_1 selected by the selection signal when the first modulation scheme is used is represented by the following equation (1), for example, where the signal value $d_1$ is obtained from the amplification unit 712 when this modulation scheme is used.

$$m_1 = dx/d_1 \quad (1)$$

Likewise, a factor $m_N$ that is set to the gate amplification unit 714_N selected by the selection signal when the Nth modulation scheme is used is represented by the following equation (2), for example, where the signal value $d_N$ is obtained from the amplification unit 712 when this modulation scheme is used.

$$m_N = dx/d_N \quad (2)$$

Note that an arbitrary value can be set for the uniform signal value dx. For example, when $dx=d_1$, the gate amplification unit 714_1 can omit an amplification process. Further, because the signal values $d_1$ to $d_N$ can be acquired by carrying out simulation, experiment or the like, the amplification factor to be set to each of the gate amplification units 714_1 to 714_N is determined according to the above equations. Note that this factor may be a negative value or a value of 1 or less.

The bias control unit 715 is the equivalent of the bias control unit 50 described above. The bias control unit 715 generates a bias value at which the center of the amplitude of the drive electrical signal corresponds to the transmission characteristics of the optical modulator by using the signal value output from any one of the gate amplification units 714_1 to 714_N. To be more specific, the bias control unit 715 of the first control unit 701 generates a bias value $B_I$ at which the center of the amplitude of the drive electrical signal $E_I$ corresponds to the transmission characteristics of the first modulation unit 410 by using the signal value output from any one of the gate amplification units 714_1 to 714_N. Further, the bias control unit 715 of the second control unit 702 generates a bias value $B_Q$ at which the center of the amplitude of the drive electrical signal $E_Q$ corresponds to the transmission characteristics of the second modulation unit 420 by using the signal value output from any one of the gate amplification units 714_1 to 714_N.

Note that the bias control unit 715 makes adjustments according to the same adjustment method regardless of a modulation scheme used. The bias control unit 715 generates a bias value at which the average voltage value (i.e., bias voltage) of the amplitude of the drive electrical signal coincides with the minimum point (i.e., null point) of the transmission characteristics of the optical modulator 400 by a specified adjustment method. Although an arbitrary adjustment method can be used as the specified adjustment method, an example of a specific adjustment method is described later. The bias control unit 715 outputs the generated bias value to the adder 718.

The bias control unit 715 may be configured using a microcomputer such as a digital signal processor (DSP), for example, which can perform arithmetic processing based on an input signal. In this case, the DSP includes a CPU and a memory, which are not shown, and performs the above-described processing by the CPU executing a program loaded to the memory, for example.

The amplitude control unit 716 generates amplitude information causing the amplitude of the drive electrical signal to correspond to the transmission characteristics of the optical modulator. Specifically, the amplitude control unit 716 generates amplitude information for adjusting the voltage value of the drive electrical signal to a specified position between the peak points in the transmission characteristics of the optical modulator. To be more specific, the amplitude control unit 716 of the first control unit 701 generates a drive amplitude $A_I$ at which the amplitude of the drive electrical signal $E_I$ corresponds to the transmission characteristics of the first modulation unit 410. Further, the amplitude control unit 716 of the second control unit 702 generates a drive amplitude $A_Q$ at which the amplitude of the drive electrical signal $E_Q$ corresponds to the transmission characteristics of the second modulation unit 420. The amplitude control unit 716 generates amplitude information corresponding to a modulation scheme to be applied for transmission among a plurality of predetermined modulation schemes. The amplitude control unit 716 outputs the generated drive amplitude to the adder 719.

The amplitude control unit 716 may be configured using a microcomputer such as a digital signal processor (DSP), for example, which can perform arithmetic processing based on an input signal. In this case, the DSP includes a CPU and a memory, which are not shown, and performs the above-described processing by the CPU executing a program loaded to the memory, for example.

The amplification unit 717 is an amplifier, for example, and it amplifies the signal output from the low-frequency signal generation unit 710, and outputs the signal to the adder 718 to which the output from the bias control unit 715 is input or to the adder 719 to which the output from the amplitude control unit 716 is input. The amplification unit 717 changes where to output the signal according to a switch signal from the DSP 800, for example.

The adder 718 adds the signal (bias value) from the bias control unit 715 and the signal (dither signal) from the amplification unit 717 and outputs the result. Further, the adder 719 adds the signal (drive amplitude) from the amplitude control unit 716 and the signal (dither signal) from the amplification unit 717 and outputs the result. As described above, the adder 718 and the adder 719 add the dither signal to the input signal and output the result when the dither signal is output from the amplification unit 717. The dither signal is thereby superimposed on the bias value or the drive amplitude. Note that the adders 718 and 719 may switch whether or not to add the dither signal output from the amplification unit 717 to the input signal based on the switch signal, rather than changing where to output the signal from the amplification unit 717 by the switch signal.

Further, superimposition of the dither signal in the first control unit 701 and superimposition of the dither signal in the second control unit 702 are not performed simultaneously. For example, the first control unit 701 and the second control unit 702 perform superposition of the dither signal alternately by the switch signal from the DSP 800. Note that superimposition of the dither signal in the first control unit 701 and superimposition of the dither signal in the second control unit 702 are not performed simultaneously because the first control unit 701 and the second control unit 702 superimpose the dither signal with the same frequency. Therefore, this does not apply when the low-frequency signal generation unit 710 in the first control unit 701 outputs the signal with a frequency $f_1$ and the low-frequency signal generation unit 710 in the second control unit 702 outputs the signal with a frequency $f_2$ different from the frequency $f_1$.

The output from the adder 718 in the first control unit 701 is input to the first modulation unit 410, and the output from the adder 718 in the second control unit 702 is input to the second modulation unit 420. Further, the output from the adder 719 in the first control unit 701 is input to the first driver unit 310, and the output from the adder 719 in the second control unit 702 is input to the second driver unit 320.

In the control unit 700, it is possible to obtain a uniform signal value in accordance with the deviation of the bias voltage from the optimum point regardless of a modulation scheme by the gate amplification units 714_1 to 714_N as described above. Thus, the bias control unit 715 does not need to change the adjustment method for each modulation scheme. The transmitter 100 can thereby appropriately adjust the bias voltage of the modulator without depending on a modulation scheme. Specifically, it is possible to appropriately adjust the bias voltage of the modulator even when the transmitter 100 switches between QAM with the modulation level m1 and QAM with the modulation level m2 as modulation schemes in a time division manner, for example.

Hereinafter, two examples of the adjustment method that can be used in the bias control unit 715 are described. In the adjustment method according to the first example, the bias control unit 715 adjusts the bias value so that the frequency of the change of the amplitude of the extracted dither signal becomes twice the frequency of the dither signal. Bias control can be achieved by the adjustment method according to the first example as described below.

Figure 12:
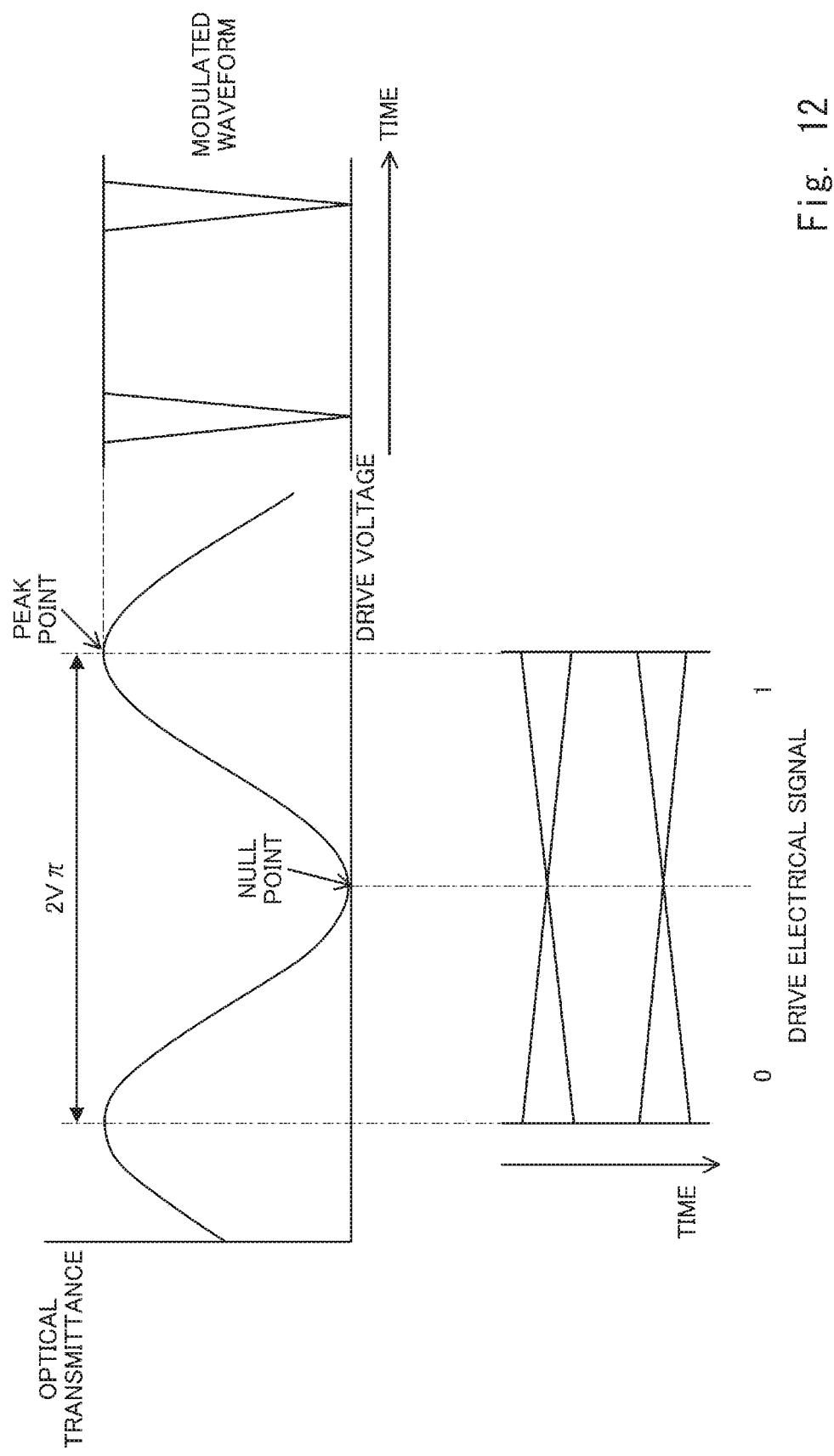
FIG. 12 is a view showing the relationship between a drive voltage applied to the first modulation unit and the second modulation unit and the light transmission output of an optical modulator in an optical transmitter in a binary modulation scheme.

FIG. 12 is a view showing the relationship between the drive voltage applied to the first modulation unit 410 and the second modulation unit 420 and the light transmission output of the optical modulator 400 in the transmitter 100 in a binary modulation scheme to which a Mach-Zehnder optical modulator is applied. Note that the binary modulation scheme is a modulation scheme where the drive electrical signal can have two voltage values, and there is one type of amplitude of the drive electrical signal. In this case, the control unit 700 adjusts the amplitude of the drive electrical signal so that "0" and "1" of the drive electrical signal correspond to the two adjacent maximum (peak) points of the transmission characteristics of the optical modulator 400, for example. Specifically, the control unit 700 adjusts the amplitude of the drive electrical signal so that a voltage difference between the voltage value of the drive electrical signal corresponding to "0" and the voltage value of the drive electrical signal corresponding to "1" becomes equal to a voltage difference ($2V\pi$) between the peak points. At the same time, the control unit 700 adjusts the bias value so that the average voltage (intermediate voltage) of the amplitude of the drive electrical signal coincides with the minimum point (null point) of the transmission characteristics of the optical modulator 400. "0"/"$\pi$" of the drive electrical signal is thereby converted into a carrier phase "0"/"$\pi$" of the modulated signal.

Figure 13A:
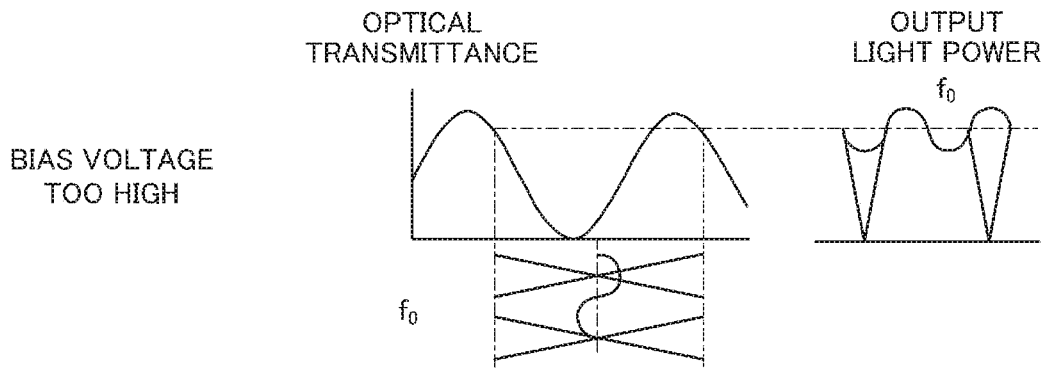
FIG. 13A is a view showing control results when control using a bias value on which a dither signal is superimposed is applied in an optical transmitter in a binary modulation scheme.
Figure 13B:
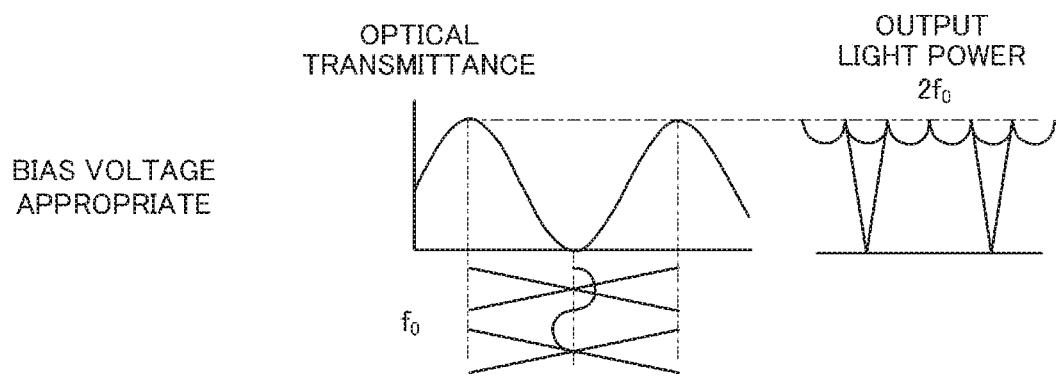
FIG. 13B is a view showing control results when control using a bias value on which a dither signal is superimposed is applied in an optical transmitter in a binary modulation scheme.
Figure 13C:
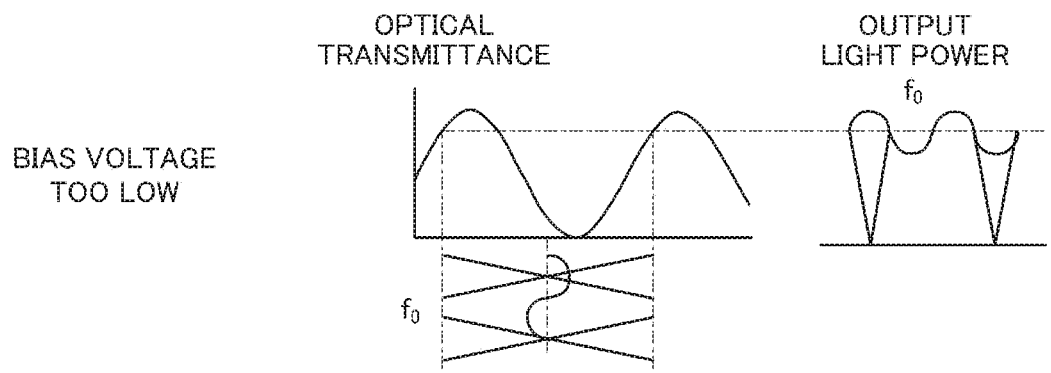
FIG. 13C is a view showing control results when control using a bias value on which a dither signal is superimposed is applied in an optical transmitter in a binary modulation scheme.

Specifically, the control unit 700 superimposes the dither signal with the frequency $f_0$ on the bias value to be output to the optical modulator 400, and varies the average voltage (bias voltage) of the drive electrical signal with the frequency $f_0$. FIGS. 13A to 13C show the relationship between the bias voltage V at this time and the detected voltage of the $f_0$ component detected through the optical detection unit 600.

As shown in FIG. 13B, when the maximum voltage of the amplitude of the drive electrical signal coincides with the peak of the transmission characteristics of the optical modulator 400, the minimum voltage of the amplitude of the drive electrical signal coincides with the peak adjacent to this peak, and the average voltage (bias voltage) coincides with the null point, a change with the frequency $2f_0$ in the amplitude appears in the detected voltage of the $f_0$ component detected through the optical detection unit 600. In other words, the frequency of the change of the amplitude of the extracted dither signal becomes twice the frequency of the dither signal.

On the other hand, when the bias voltage is deviated from the null point, a change with the frequency $f_0$ in the amplitude appears in the detected voltage of the $f_0$ component detected through the optical detection unit 600 as shown in FIG. 13A or 13C. The phase of the frequency $f_0$ is reversed between when the bias voltage is higher than the most appropriate voltage value (FIG. 13A) and when it is lower than that (FIG. 13C). Thus, by adjusting the bias value using feedback control, for example, so that the frequency of the change of the amplitude of the extracted dither signal becomes twice the frequency of the dither signal, it is possible to set the bias voltage to the most appropriate voltage value. Therefore, it is possible to appropriately control the bias voltage by using the bias voltage on which the dither signal is superimposed in the transmitter 100 to which a binary modulation scheme is applied.

The adjustment method according to the second example is described hereinafter. In the adjustment method according to the second example, the bias control unit 715 adjusts the bias value so that the differential value of the strength of the extracted dither signal becomes zero. Bias control can be achieved by the adjustment method according to the second example as described below. Prior to this description, however, control results when control of superimposing the dither signal on the bias value is applied to the transmitter 100 in a multilevel modulation scheme such as 16 QAM or 64 QAM are described first. Note that the multilevel modulation scheme is a modulation scheme where the drive electrical signal can have more than two voltage values, and there are two or more types of amplitudes of the drive electrical signal. For example, in the case of 16 QAM, the drive signal can have four voltage values, and in the case of 64 QAM, the drive signal can have eight voltage values.

Figure 14A:
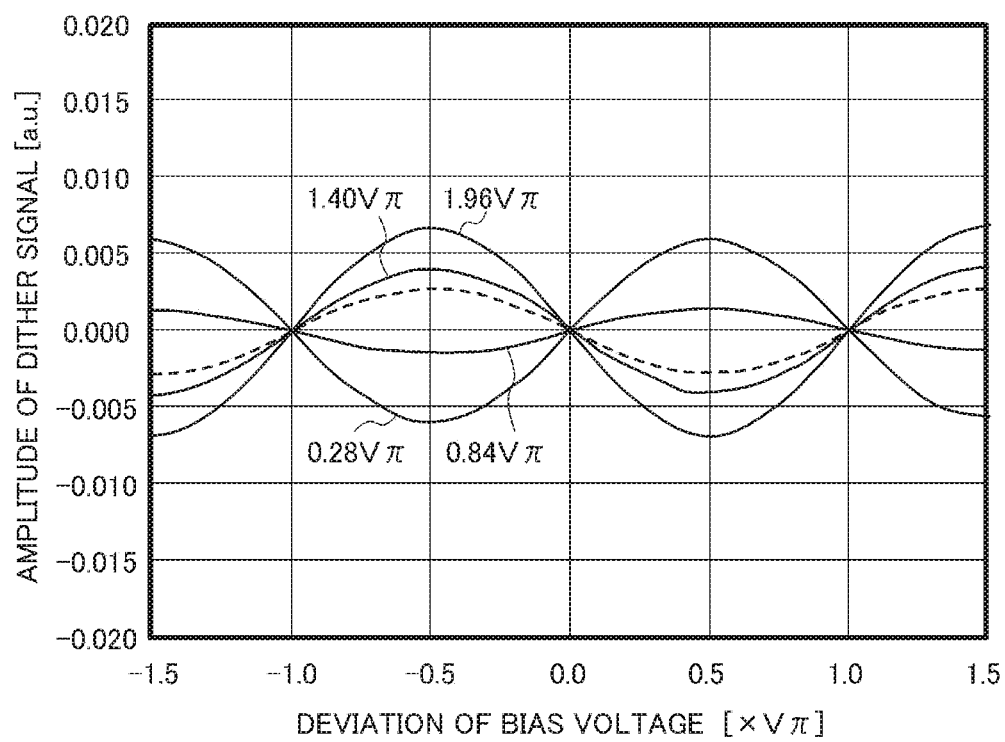
FIG. 14A shows simulation results when control using a bias value on which a dither signal is superimposed is applied.
Figure 14B:
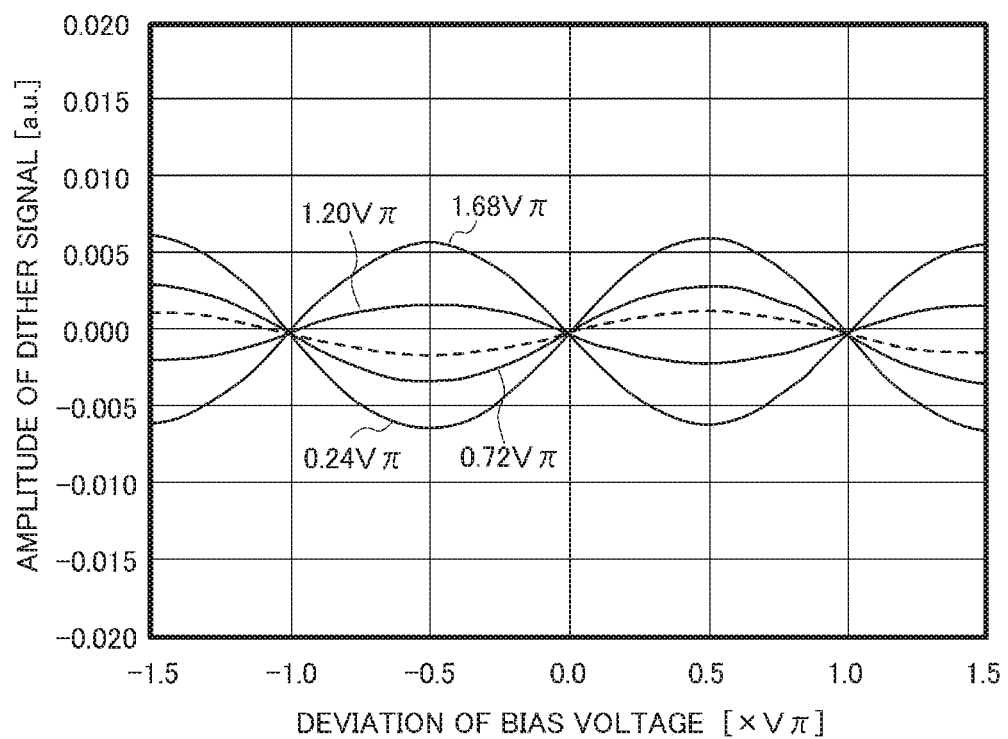
FIG. 14B shows simulation results when control using a bias value on which a dither signal is superimposed is applied.

As shown in FIG. 7, in the 64 QAM modulation scheme, eight points from $A_0$ to $A_7$ are necessary as the drive voltage. FIGS. 14A and 14B show the graphs of simulation results regarding the amplitude $V_{70}$ ($=V_7-V_0$), the amplitude $V_{61}$ ($=V_6-V_1$), the amplitude $V_{52}$ ($=V_5-V_2$), and the amplitude $V_{43}$ ($=V_4-V_3$) in FIG. 7. As for the amplitude, although an amplitude by $A_0$ and $A_5$, for example, can be also generated, simulation results regarding four types of amplitudes are shown as an example as described above. Further, in FIGS. 14A and 14B, the solid lines indicate the amplitude of the dither signal regarding the amplitude $V_{70}$, the amplitude of the dither signal regarding the amplitude $V_{61}$, the amplitude of the dither signal regarding the amplitude $V_{52}$, and the amplitude of the dither signal regarding the amplitude $V_{43}$. Further, in FIGS. 14A and 14B, the dashed line is a graph showing the sum of the amplitudes indicated by the solid lines. In FIGS. 14A and 14B, the dashed line graph shows the relationship between the amplitude of the dither signal detected through the optical detection unit 600 and the deviation of the bias voltage from the optimum point.

In FIG. 14A, $V_{70}=1.96\times V\pi$, $V_{61}=1.40\times V\pi$, $V_{52}=0.84\times V\pi$, and $V_{43}=0.28\times V\pi$. Further, in FIG. 14B, the amplitudes are smaller than those in FIG. 14A, and $V_{70}=1.60\times V\pi$, $V_{61}=1.20\times V\pi$, $V_{52}=0.72\times V\pi$, and $V_{43}=0.24\times V\pi$.

In FIG. 14A, when the bias voltage is shifted to the positive (0 to 1 $V\pi$) relative to the optimum point (0V), the detected voltage (dashed line) of the $f_0$ component detected through the optical detection unit 600 is a negative voltage. Further, in FIG. 14A, when the bias voltage is shifted to the negative (0 to −1 $V\pi$) relative to the optimum point (0V), the detected voltage is a positive voltage.

On the other hand, in FIG. 14B, in the case where the amplitudes are slightly smaller than those in the example of FIG. 14A, when the bias voltage is shifted to the positive (0 to 1 $V\pi$) relative to the optimum point (0V), the detected voltage (dashed line) of the $f_0$ component detected through the optical detection unit 600 is a positive voltage. Further, in FIG. 14B, when the bias voltage is shifted to the negative (0 to −1 $V\pi$) relative to the optimum point (0V), the detected voltage is a negative voltage.

Specifically, in the transmitter 100 to which a multilevel modulation scheme is applied, the direction of the deviation of the bias voltage from the optimum point (null point) is not uniquely determined by the detected voltage of the $f_0$ component if control using the bias voltage on which the dither signal is superimposed is applied. Thus, in the transmitter 100 to which a multilevel modulation scheme is applied, it is not easy to control the bias voltage to the null point even when the dither signal is superimposed on the bias voltage. Thus, when a multilevel modulation scheme is applied to the transmitter 100, the control unit 700 superimposes the dither signal on the drive amplitude to be output to the first driver unit 310 and the second driver unit 320.

In light of the above study, bias control can be achieved by the adjustment method according to the second example as described below. The adjustment method according to the second example is bias control that superimposes the dither signal on the drive amplitude in the following manner.

Control results when control using the drive amplitude on which the dither signal is superimposed is performed in the transmitter 100 in a multilevel modulation scheme are described. Note that control results when control using the drive amplitude on which the dither signal is superimposed is performed under the same conditions as those described in FIGS. 14A and 14B in the transmitter 100 in the 64 QAM modulation scheme are described below.

Figure 15A:
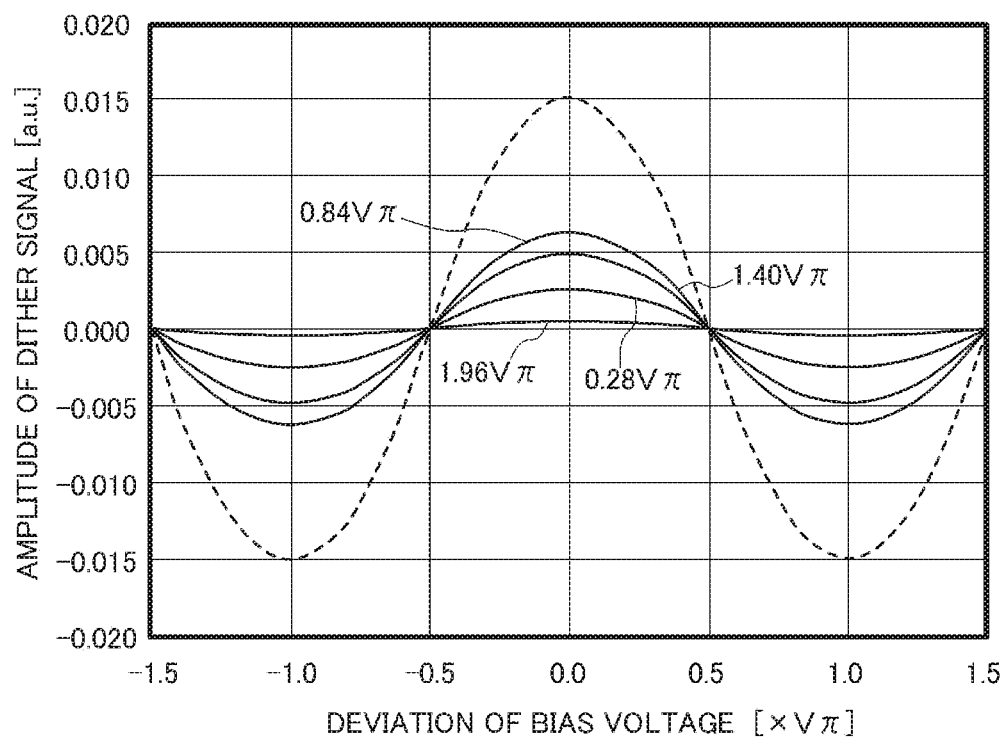
FIG. 15A shows simulation results when control using a drive amplitude on which a dither signal is superimposed is applied.
Figure 15B:
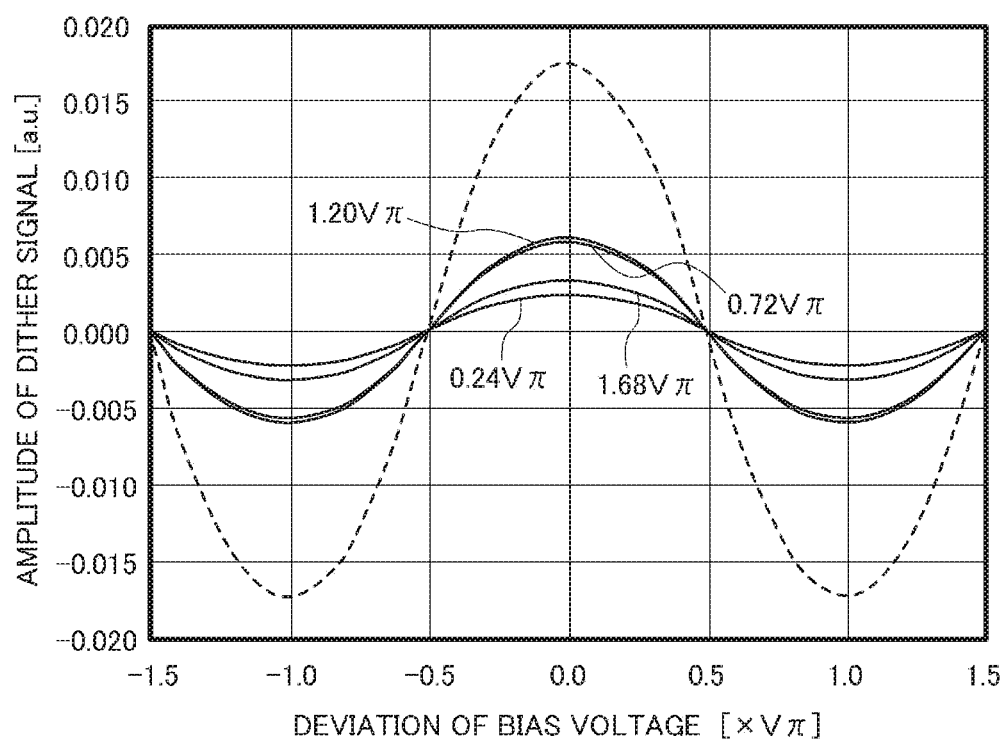
FIG. 15B shows simulation results when control using a drive amplitude on which a dither signal is superimposed is applied.

FIG. 15A shows simulation results when the dither signal is superimposed on the drive amplitude in the case where $V_{70}=1.96\times V\pi$, $V_{61}=1.40\times V\pi$, $V_{52}=0.84\times V$, and $V_{43}=0.28\times V\pi$. FIG. 15B shows simulation results when the dither signal is superimposed on the drive amplitude in the case where $V_{70}=1.60\times V\pi$, $V_{61}=1.20\times V\pi$, $V_{52}=0.72\times V\pi$, and $V_{43}=0.24\times V\pi$. In FIGS. 15A and 15B, the solid lines indicate the amplitude of the dither signal regarding the amplitude $V_{70}$, the amplitude of the dither signal regarding the amplitude $V_{61}$, the amplitude of the dither signal regarding the amplitude $V_{52}$, and the amplitude of the dither signal regarding the amplitude $V_{43}$. Further, in FIGS. 15A and 15B, the dashed line is a graph showing the sum of the amplitudes indicated by the solid lines. In FIGS. 15A and 15B, the dashed line graph shows the relationship between the amplitude of the dither signal detected through the optical detection unit 600 and the deviation of the bias voltage from the optimum point.

As shown in FIGS. 15A and 15B, the detected voltage that is detected through the optical detection unit 600 is as follows even when the amplitude is different. Specifically, when the deviation of the bias voltage from the optimum point (0V) is in the range of −0.5 to +0.5$V\pi$, the detected voltage is a positive voltage and, otherwise, the detected voltage is a negative voltage. To be specific, when the dither signal is superimposed on the drive amplitude, it is possible to detect the deviation from the optimum point (null point) in the transmitter 100 to which a multilevel modulation scheme is applied.

Figure 16:
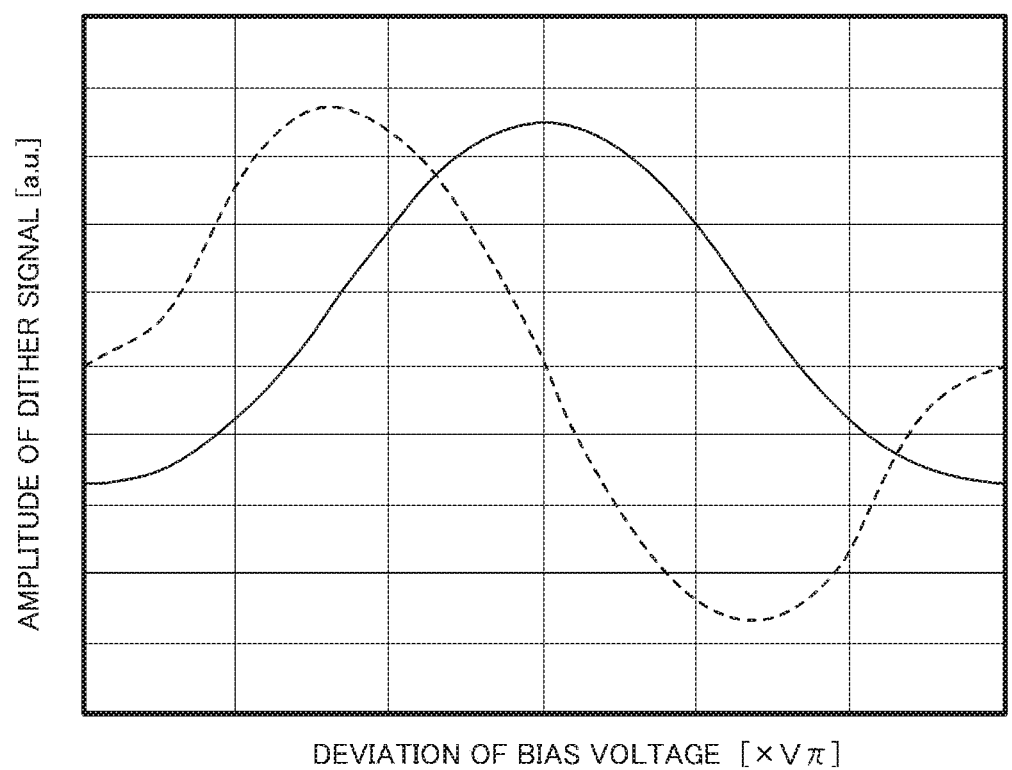
FIG. 16 shows simulation results regarding a differential value when control using a drive amplitude on which a dither signal is superimposed is applied.

FIG. 16 shows results of differentiating the detected voltage shown in FIG. 15A or FIG. 15B. In FIG. 16, the solid line is the graph showing the sum of the amplitudes indicated by the solid lines in FIG. 15A or FIG. 15B. In other words, in FIG. 16, the solid line corresponds to the dashed line in FIG. 15A or FIG. 15B. Further, in FIG. 16, the dashed line is the graph where the solid line graph in FIG. 16 is differentiated. Thus, the dashed line graph in FIG. 16 indicates the differential value of the strength of the dither signal. As shown in the dashed line in FIG. 16, when the bias voltage is shifted to the positive (0 to 1 $V\pi$) relative to the optimum point (0V), the differential value of the detected voltage (the strength of the dither signal) is a negative voltage. On the other hand, when the bias voltage is shifted to the negative (0 to −1 $V\pi$) relative to the optimum point (0V), the differential value is a positive voltage. Thus, by adjusting the bias value using feedback control, for example, so that the differential value of the strength of the extracted dither signal becomes zero, it is possible to set the bias voltage to the most appropriate voltage value. In other words, the bias control unit 715 varies the bias value and adjusts the bias value based on the variation (differential value) of the signal value input from the gate amplification units 714_1 to 714_N, and it is thereby possible to set the bias voltage to the most appropriate voltage value. Therefore, by using results of differentiating the strength of the dither signal, it is possible to set the bias voltage to the optimum point (null point) even when a multilevel modulation scheme is applied to the transmitter 100.

Although the adjustment method according to the first example and the second adjustment method are described above, the bias control unit 715 may control the bias voltage by an arbitrary adjustment method, not limited to the above methods. Further, it should be noted that, when the adjustment method according to the first example is used, for example, the bias control unit 715 can control the bias voltage by the adjustment method according to the first example regardless of an applied modulation scheme. This is because the gate amplification units 714_1 to 714_N generate a uniform signal value as described above. For example, although it is described above that the adjustment method according to the first example is effective for a binary modulation scheme, even when a multilevel modulation scheme is used, it is possible to obtain the bias voltage by the adjustment method according to the first example if the gate amplification units 714_1 to 714_N amplifies the input signal value so as to convert it into the signal value in a binary modulation scheme. Specifically, it is possible to apply an adjustment method, which should be usually applied to a binary modulation scheme, also to a multilevel modulation scheme by setting the above-described uniform signal value dx to coincide with the signal value in a binary modulation scheme, for example. Likewise, when the adjustment method according to the second example is used, for example, the bias control unit 715 can control the bias voltage by the adjustment method according to the second example regardless of an applied modulation scheme.

As described above, when transmission is carried out in a binary modulation scheme, it is preferred that the control unit 700 superimposes the dither signal on the bias value, and when transmission is carried out in a multilevel modulation scheme, it is preferred that the control unit 700 superimposes the dither signal on the amplitude information.

As described in the foregoing, in the transmitter 100 according to this embodiment, a uniform signal value in accordance with the deviation of the bias voltage without depending on a modulation scheme is generated. Then, based on this uniform signal value, the bias voltage on the optical modulator 400 is adjusted by an arbitrary adjustment method without depending on a modulation scheme. Therefore, in the transmitter 100, it is possible to appropriately adjust the bias voltage of the optical modulator 400 regardless of a modulation scheme.

Further, the above-described transmitter 100 can switch between modulation schemes with different modulation levels. When any of the modulation schemes is applied, it is possible to control the bias voltage of the optical modulator 400 to the optimum point by the same adjustment method. It is therefore possible to appropriately control the bias voltage also on a modulation scheme-variable optical transmitter that switches and uses a plurality of optical modulation schemes, which is expected to become mainstream in years to come. Even when the information electronic signal rate is 100 Gbit/s or 400 Gbit/s, it does not affect the control operation described above. Thus, dependence on a bit rate does not occur. Further, dependence on a modulation scheme also does not occur.

Because the frequency $f_0$ of the dither signal can be as low as kHz even for signals with different bit rates where the information electronic signal rate is 100 Gbit/s, 200 Gbit/s, 400 Gbit/s or the like, the photoelectric conversion unit 610, the current-voltage conversion unit 620 and the amplification unit 640 that constitute the optical detection unit 600, the multiplier 711, the amplification units 712 and 717 and the adders 718 and 719 that constitute the control unit 700 and the like only need to operate at speed as low as kHz, and therefore they can be configured using inexpensive low-speed parts, which are not for high-speed signals.

It should be noted that the present invention is not limited to the above-described embodiment and may be varied in many ways within the scope of the present invention. For example, the control unit 700 is not limited to be configured by hardware, and it may be configured by software. Further, the above-described program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

While the invention has been particularly shown and described with reference to embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-140698 filed on Jul. 15, 2016, the disclosure of which is incorporated herein in its entirety by reference.

REFERENCE SIGNS LIST

10 TRANSMITTER
20 OPTICAL MODULATOR
30 DRIVE UNIT
40 DEVIATION IDENTIFICATION SIGNAL GENERATION UNIT
50 BIAS CONTROL UNIT
100 TRANSMITTER
200 LIGHT SOURCE
310 FIRST DRIVER UNIT
320 SECOND DRIVER UNIT
400 OPTICAL MODULATOR
410 FIRST MODULATION UNIT
420 SECOND MODULATION UNIT
430 PHASE ADJUSTMENT UNIT

500 BRANCH UNIT
600 OPTICAL DETECTION UNIT
610 PHOTOELECTRIC CONVERSION UNIT
620 CURRENT-VOLTAGE CONVERSION UNIT
630 BPF
640, 712, 717 AMPLIFICATION UNIT
700 CONTROL UNIT
701 FIRST CONTROL UNIT
702 SECOND CONTROL UNIT
710 LOW-FREQUENCY SIGNAL GENERATION UNIT
711 MULTIPLIER
713 SERIAL-TO-PARALLEL CONVERTER
714_1 TO 714_N GATE AMPLIFICATION UNIT
715 BIAS CONTROL UNIT
716 AMPLITUDE CONTROL UNIT
718, 719 ADDER

The invention claimed is:

1. A transmitter comprising:
an optical modulator configured to modulate continuous wave light by any one of a plurality of modulation schemes according to a drive signal;
a driver circuit configured to generate the drive signal based on information data;
a deviation identification signal generation circuit configured to generate a signal value in accordance with a deviation of a bias voltage of the optical modulator by amplifying a signal value of a dither signal extracted from a modulated signal output from the optical modulator by a factor set for each of the plurality of modulation schemes so as to generate a uniform signal value; and
a bias controller configured to generate a bias value at which a center of a variation range from a maximum value to a minimum value of the drive signal corresponds to transmission characteristics of the optical modulator according to one predetermined adjustment method by using the signal value generated by the deviation identification signal generation circuit,
wherein the optical modulator operates with a bias voltage adjusted based on the bias value.

2. The transmitter according to claim 1, wherein
the deviation identification signal generation circuit includes an amplifier unit selected according to a selection signal identifying a currently applied modulation scheme, and
the amplifier selected by the selection signal amplifies the signal value of the extracted dither signal by the factor.

3. The transmitter according to claim 1, wherein
the dither signal is a signal with a predetermined frequency superimposed on the bias value, and
the bias controller adjusts the bias value so that a frequency of a change of an amplitude of the extracted dither signal becomes twice the predetermined frequency as adjustment according to the one predetermined adjustment method.

4. The transmitter according to claim 1, further comprising:
an amplitude controller configured to generate amplitude information causing an amplitude of the drive signal to correspond to transmission characteristics of the optical modulator, wherein
the driver circuit generates the drive signal by adjusting an amplitude of the information data based on the amplitude information,
the dither signal is a signal superimposed on the amplitude information, and
the bias controller adjusts the bias value so that a differential value of a strength of the extracted dither signal becomes zero as adjustment according to the one predetermined adjustment method.

5. The transmitter according to claim 1, comprising:
a signal processor configured to determine a modulation scheme to be applied for transmission among the plurality of modulation schemes,
wherein the signal processor switches between two or more modulation schemes among the plurality of modulation schemes in a time division manner.

6. The transmitter according to claim 5, wherein the plurality of modulation schemes include QAM (Quadrature Amplitude Modulation) with a first modulation level and QAM with a second modulation level different from the first modulation level, and
the signal processor switches between the QAM with the first modulation level and the QAM with the second modulation level in a time division manner.

7. A bias adjustment method comprising:
generating a drive signal based on information data;
modulating continuous wave light by any one of a plurality of modulation schemes according to the drive signal and generating a modulated signal in an optical modulator;
extracting a dither signal from the modulated signal;
generating a signal value in accordance with a deviation of a bias voltage of the optical modulator by amplifying a signal value of the extracted dither signal by a factor set for each of the plurality of modulation schemes so as to generate a uniform signal value; and
generating a bias value at which a center of a variation range from a maximum value to a minimum value of the drive signal corresponds to transmission characteristics of the optical modulator according to one predetermined adjustment method by using the generated signal value,
wherein the optical modulator operates with a bias voltage adjusted based on the bias value.

* * * * *